United States Patent
Kim

(10) Patent No.: US 9,848,153 B2
(45) Date of Patent: *Dec. 19, 2017

(54) IMAGE PROCESSING DEVICE TO EXTRACT COLOR AND DEPTH DATA FROM IMAGE DATA, AND MOBILE COMPUTING DEVICE HAVING THE SAME

(71) Applicant: Samsung Electronics Co., Ltd., Suwon-si, Gyeonggi-do (KR)

(72) Inventor: Tae Chan Kim, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/287,045

(22) Filed: Oct. 6, 2016

(65) Prior Publication Data

US 2017/0026602 A1    Jan. 26, 2017

Related U.S. Application Data

(63) Continuation of application No. 14/696,100, filed on Apr. 24, 2015, now Pat. No. 9,491,442.
(Continued)

(30) Foreign Application Priority Data

Feb. 12, 2015    (KR) .................. 10-2015-0021547

(51) Int. Cl.
*H04N 5/378* (2011.01)
*H04N 13/02* (2006.01)
(Continued)

(52) U.S. Cl.
CPC ............... *H04N 5/378* (2013.01); *G06T 7/50* (2017.01); *G06T 7/90* (2017.01); *H04N 5/2353* (2013.01);
(Continued)

(58) Field of Classification Search
CPC .... H04N 5/378; H04N 5/2353; H04N 5/3535; H04N 5/374; H04N 9/04; H04N 9/07;
(Continued)

(56) References Cited

U.S. PATENT DOCUMENTS 6,769,769 B2    8/2004 Podoleanu et al.
8,531,560 B2    9/2013 Kimura
(Continued)

FOREIGN PATENT DOCUMENTS

JP    2010169709 A    8/2010
JP    2010252277 A    11/2010
(Continued)

*Primary Examiner* — Tuan Ho
(74) *Attorney, Agent, or Firm* — Harness, Dickey & Pierce, P.L.C.

(57) ABSTRACT

In an example embodiment, an image processing device includes a pixel array including pixels two-dimensionally arranged and configured to capture an image, each of the pixels including a plurality of photoelectric conversion elements and an image data processing circuit configured to generate image data from pixel signals output from the pixels. The image processing device further includes a color data processing circuit configured to extract color data from the image data and output extracted color data. The image processing device further includes a depth data extraction circuit configured to extract depth data from the image data and output extracted depth data. The image processing device further includes an output control circuit configured to control the output of the color data and the depth data.

20 Claims, 30 Drawing Sheets

Related U.S. Application Data

(60) Provisional application No. 61/985,019, filed on Apr. 28, 2014.

(51) Int. Cl.
*H04N 5/374* (2011.01)
*H04N 9/07* (2006.01)
*H04N 5/353* (2011.01)
*H04N 5/235* (2006.01)
*H04N 9/04* (2006.01)
*G06T 7/50* (2017.01)
*G06T 7/90* (2017.01)

(52) U.S. Cl.
CPC ........... *H04N 5/3535* (2013.01); *H04N 5/374* (2013.01); *H04N 9/04* (2013.01); *H04N 9/07* (2013.01); *H04N 13/0257* (2013.01); *H04N 13/0271* (2013.01)

(58) Field of Classification Search
CPC .. H04N 13/0257; H04N 13/0271; G06T 7/50; G06T 7/90
See application file for complete search history.

(56) References Cited

U.S. PATENT DOCUMENTS

| | | | |
|---|---|---|---|
| 8,570,427 | B2 | 10/2013 | Ohnishi et al. |
| 2013/0050430 | A1 | 2/2013 | Lee |
| 2013/0107009 | A1 | 5/2013 | Hiramoto et al. |
| 2013/0176401 | A1 | 7/2013 | Monari et al. |
| 2013/0235276 | A1 | 9/2013 | Ogawa |
| 2013/0341750 | A1* | 12/2013 | Ichikawa .......... H01L 27/14605 257/440 |
| 2015/0249795 | A1 | 9/2015 | Cho et al. |

FOREIGN PATENT DOCUMENTS

| | | |
|---|---|---|
| JP | 2012133138 A | 7/2012 |
| JP | 2012191400 A | 10/2012 |
| JP | 2013222016 A | 10/2013 |
| KR | 20100124717 A | 11/2010 |
| KR | 20120127903 A | 11/2012 |
| KR | 20130066565 A | 6/2013 |

\* cited by examiner

<PAF Pixel>

IMAGE PROCESSING DEVICE TO EXTRACT COLOR AND DEPTH DATA FROM IMAGE DATA, AND MOBILE COMPUTING DEVICE HAVING THE SAME

CROSS-REFERENCE TO RELATED APPLICATION

This application is a continuation of application Ser. No. 14/696,100 filed on Apr. 24, 2015 which claims priority under 35 U.S.C. §119(e) to U.S. provisional patent application No. 61/985,019 filed on Apr. 28, 2014, and under 35 U.S.C. §119(a) to Korean Patent Application No. 10-2015-0021547 filed on Feb. 12, 2015, the entire contents of each of which are hereby incorporated by reference

BACKGROUND

Embodiments of the present inventive concepts relate to an image processing device, and particularly to an image processing device which is capable of outputting color data and depth data extracted from data output from a full PAF pixel array in a parallel manner and/or in a serial manner, and a mobile computing device including the same.

PAF stands for a phase detection auto focus or a phase difference auto focus. In photography, a dynamic range is the range between the maximum and minimum measurable light intensities. A varying degree of light intensity depends on a device that is used as an image capturing device, which decides an overall performance in a dynamic range of an imaging sensor.

A wide dynamic range (WDR) is also referred to as a high dynamic range (HIDR). A WDR technology physically increases a pixel performance or increases a dynamic range of an imaging sensor by applying multiple exposure times to each pixel in a digital manner.

The ideal WDR sensor is a sensor with a high full well capacity (FWC). The FWC is defined as the maximum number of electrons of an incident signal that can be accommodated without saturation during readout. As the FWC increase, the dynamic range of an image sensor is increased.

In a digital signal lens reflex (DSLR) camera, a camera sensor includes pixels which can directly detect a phase difference so as to reduce a space occupied by a phase difference auto-focus module. Accordingly, the DSLR camera may perform an auto-focus. Such a technology is applied to a mirrorless DSLR.

The phase difference detecting pixel of the related art shields a portion of a photodiode with metal or the like, and detects only light incident onto an unshielded portion of the photodiode. In the related art, a method of detecting a phase difference using a shielded portion and an unshielded portion, that is, two pixels, has a problem that an image quality of a color image is deteriorated by two pixels which irregularly operate.

SUMMARY

In an example embodiment, an image processing device includes a pixel array including pixels two-dimensionally arranged and configured to capture an image, each of the pixels including a plurality of photoelectric conversion elements and an image data processing circuit configured to generate image data from pixel signals output from the pixels. The image processing device further includes a color data processing circuit configured to extract color data from the image data and output extracted color data. The image processing device further includes a depth data extraction circuit configured to extract depth data from the image data and output extracted depth data. The image processing device further includes an output control circuit configured to control the output of the color data and the depth data.

In one example embodiment, the image processing device is embodied in one CMOS image sensor chip.

In one example embodiment, the pixel array and the image data processing circuit are integrated into a first chip, and the color data processing circuit, the depth data extraction circuit, and the output control circuit are integrated into a second chip.

In one example embodiment, the image processing device further includes an application processor configured to control operations of the color data processing circuit, the depth data extraction circuit, and the output control circuit.

In one example embodiment, the image data include long-exposure image data and short-exposure image data.

In one example embodiment, the output control circuit is configured to output the color data and the depth data on a line basis in a parallel manner.

In one example embodiment, the output control circuit is configured to determine an output order of the color data and the depth data.

In one example embodiment, the output control circuit is configured to output the color data and the depth data in a serial manner.

In one example embodiment, the output control circuit is configured to output the color data and the depth data, both having different sizes in a serial manner during one-horizontal time period.

In one example embodiment, the output control circuit is configured to output the color data corresponding to a first number of lines and the depth data corresponding to a second number lines in a serial manner, each of the first number of lines and the second number of lines is a natural number, and the first number of lines is equal to or greater than the second number of lines.

In one example embodiment, the output control circuit is configured to output the color data corresponding to a first number of pixels and the depth data corresponding to a second number of pixels in a serial manner, each of the first number of pixels and the second number of pixels are natural numbers, and the first number of pixels is equal to or greater than the second number of pixels.

In an example embodiment, a mobile computing device includes an image sensor configured to generate image data, the image sensor including a pixel array including pixels two-dimensionally arranged and configured to capture an image, each of the pixels including a plurality of photoelectric conversion elements, and an image data processing circuit configured to generate the image data from pixel signals output from the pixels. The mobile computer device further includes a processing circuit configured to process the image data, the processing circuit including a color data processing circuit configured to extract color data from the image data, and output extracted color data. The processing circuit further includes a depth data extraction circuit configured to extract depth data from the image data, and output extracted depth data. The mobile computing device further includes an output control circuit configured to control the output of the color data and the depth data.

In one example embodiment, the image data include long-exposure image data and short-exposure image data, the long-exposure image data corresponding to a first pixel signal output from a first photoelectric conversion element included in each of the plurality of photoelectric conversion elements, and the short-exposure image data corresponding to a second pixel signal output from a second photoelectric conversion element included in each of the plurality of photoelectric conversion elements.

In one example embodiment, the output control circuit is configured to output the color data and the depth data on a line basis in a parallel manner.

In one example embodiment, the output control circuit is configured to determine an output order of the color data and the depth data.

In one example embodiment, the output control circuit is configured to output the color data and the depth data in a serial manner.

In one example embodiment, the output control circuit is configured to output the color data and the depth data having different sizes in a serial manner during one-horizontal time.

In one example embodiment, the output control circuit is configured to output the color data corresponding to a first number of lines and the depth data corresponding to a second number of lines in a serial manner, each of the first number of lines and the second number of lines is a natural number, and the first number of lines is equal to or greater than the second number of lines.

In one example embodiment, the output control circuit is configured to output the color data corresponding to a first number of pixels and the depth data corresponding to a second number of pixels, each of the first number of pixels and the second number of pixels is a natural number, and the first number of pixels is equal to or greater than the second number of pixels.

In one example embodiment, the mobile computing device further includes an application processor having another processing circuit configured to process the color data and the depth data output from the output control circuit, and the processing circuit is integrated into at least one of the image sensor and the application processor.

In an example embodiment, an image processing device includes a memory configured to store computer-readable instructions and a processor configured to execute the computer-readable instructions to generate image data from pixel signals associated with pixels of a pixel array having a plurality of photoelectric conversion elements, extract color data and depth data from the image data and output the color data and the depth data.

In one example embodiment, the pixel array is a phase difference auto-focus pixel array.

In one example embodiment, the image data include long-exposure image data and short-exposure image data, the long-exposure image data corresponding to pixel signals associated with pixels with longer exposure time to light compared to pixel signals associated with the short-exposure image data.

In one example embodiment, at least a first one of the plurality of photoelectric conversion elements is configured to generate the long-exposure image data, and at least a second one of the plurality of photoelectric conversation elements is configured to generate the short-exposure image data.

In one example embodiment, the processor is further configured to process the image data prior to extracting the color data using the long exposure image data and the short-exposure image data, the process including at least one of a noise reduction process, edge enhancement process, color correction process and a gamma process.

In one example embodiment, the processor is further configured to process the image data prior to extracting the depth data using the long-exposure image data and the short-exposure image data.

In one example embodiment, the processor is configured to process the image data by extracting disparity data between each pair of the long-exposure image data and the short-exposure image data.

BRIEF DESCRIPTION OF THE DRAWINGS

These and/or other aspects and advantages of the present inventive concepts will become apparent and more readily appreciated from the following description of the example embodiments, taken in conjunction with the accompanying drawings of which.

DETAILED DESCRIPTION OF EXAMPLE EMBODIMENTS

Figure 1:
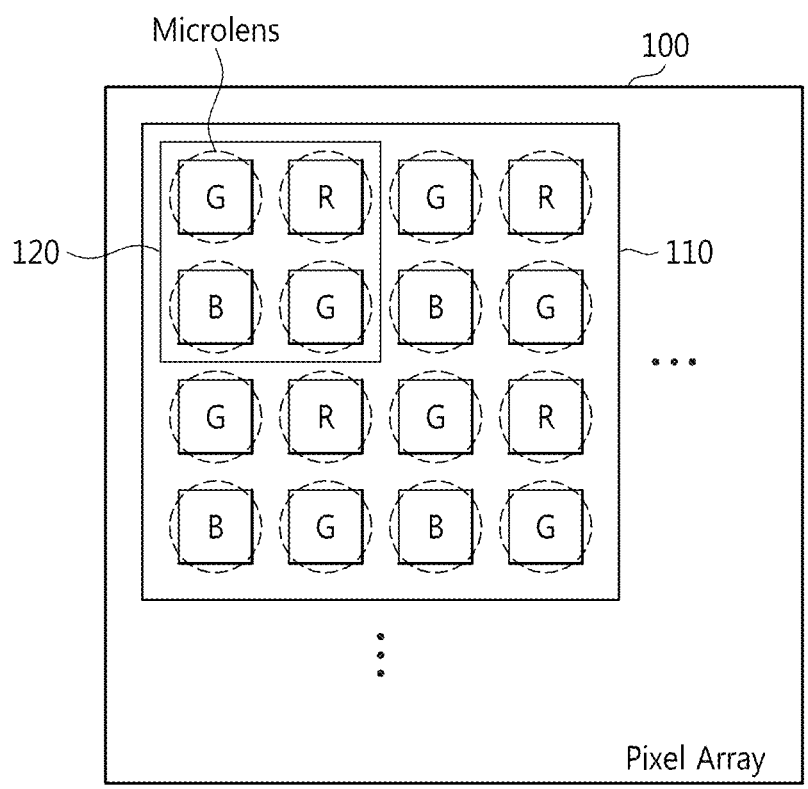
FIG. 1 shows a pixel array of an image sensor including a plurality of pixels according to an example embodiment of the present inventive concepts.

The present inventive concepts now will be described more fully hereinafter with reference to the accompanying drawings, in which example embodiments of the inventive concepts are shown. The inventive concepts may, however, be embodied in many different forms and should not be construed as limited to the embodiments set forth herein. Rather, these embodiments are provided so that this disclosure will be thorough and complete, and will fully convey the scope of the inventive concepts to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the inventive concepts. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which the present inventive concepts belong. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 shows a pixel array of an image sensor including a plurality of pixels according to an example embodiment of the present inventive concepts. Each of the plurality of pixels R, G, and B included in the pixel array 100 may include a plurality of photodiodes.

The pixel array 100 may be included in a portable electronic device. The portable electronic device may be used in a laptop computer, a cellular phone (or mobile phone), a smart phone, a tablet PC, a digital camera, a camcorder, a mobile internet device (MID), wearable computer, an internet of things (IoT) device, an internet of everything (IoE) device, and the like.

Each of the photodiodes included in the pixel array 100 may be any photo-electric conversion element and may be replaced with a phototransistor, a photogate, or a pinned-photodiode, as an example of a photo-electric conversion element. Each of the multiple photodiodes included in each pixel may independently capture light or an image.

In FIG. 1, R represents a red pixel, G represents a green pixel, and B represents a blue pixel. A corresponding microlens may be formed over each of the pixels R, G, and B. The pixel array 100 may embody WDR or HDR without a loss of resolution. A structure of each of the pixels R, G and B will be described with reference to FIGS. 7 and 8.

Figure 2:
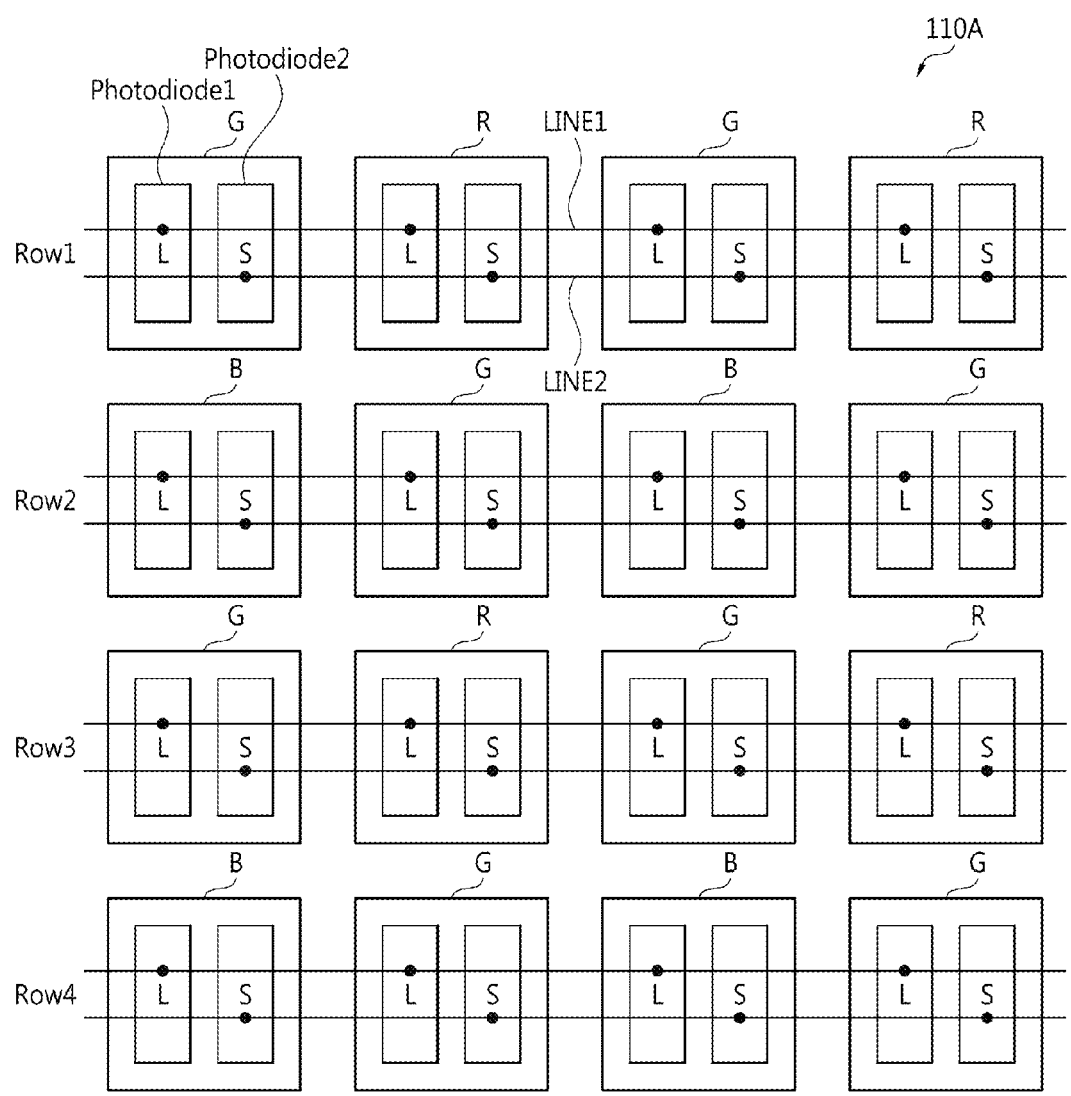
FIG. 2 shows a portion of the pixel array shown in FIG. 1 according to an example embodiment.

FIG. 2 shows a portion of the pixel array shown in FIG. 1 according to an example embodiment. FIG. 2 shows a portion 110A of the pixel array 100. Each of the pixels R, and B may include two photodiodes L and S which operate independently from each other.

In FIG. 2, L represents a first photodiode, and S represents a second photodiode. For example, L may be a photodiode which can generate a long-exposure image signal, and S may be a photodiode which can generate a short-exposure image signal.

Each of the pixels G and R disposed in respective rows Row1 and Row3 includes two photodiodes L and S. Each of the pixels B and G disposed in respective rows Row2 and Row4 includes two photodiodes L and S.

Exposure time or integration time of each of the photodiodes L and S included in each of the pixels R, G, and B may be controlled to be different from each other in an independent manner by a row driver.

For convenience of description in FIG. 2, it is shown that each of the pixels R, G, and B includes two photodiodes L and S which are left and right embodied; however, instead each of the pixels R, G, and B may include two photodiodes L and S which are up-and-down embodied according to an example embodiment. For example, a gate of a transfer transistor which is connected to each photodiode L of each of the pixels R, G, and B disposed in each of the rows Row1 to Row4 is connected to a first corresponding transfer line (or a first metal line; LINE1), and a gate of a transfer transistor connected to each photodiode S of each of the pixels R, G, and B disposed in each of the rows Row1 to Row4 is connected to a second corresponding transfer transistor (or a second metal line; LINE2).

Figure 3:
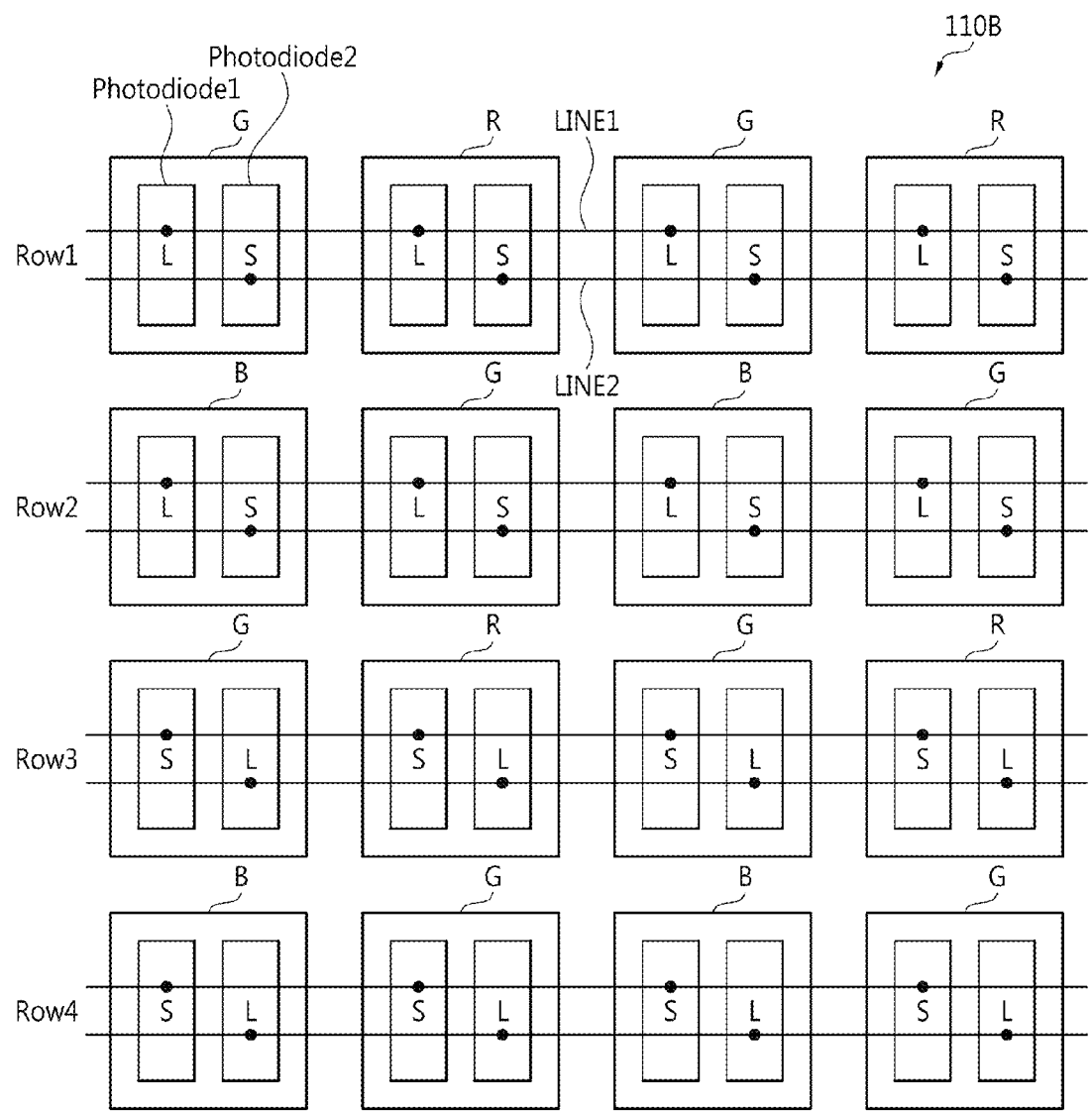
FIG. 3 shows a portion of the pixel array shown in FIG. 1 according to an example embodiment.

FIG. 3 shows a portion of the pixel array shown in FIG. 1 according to an example embodiment. FIG. 3 shows the portion 110B of the pixel array 100. Each of the pixels R, and B includes two photodiodes L and S which operate independently from each other.

Positions of two photodiodes L and S included in rows Row3 and Row4 of FIG. 3 are opposite to positions of two photodiodes L and S included in rows Row3 and Row4 of FIG. 2 each other.

In the example embodiments shown in FIGS. 2 and 3, positions of photodiodes L and S included in each of the pixels R, G, and B may be variously changed according to a design specification.

For example, the gate of a transfer transistor which is connected to each photodiode I, of each of the pixels R, G, and B disposed in each of the rows Row1 to Row4 is connected to the first corresponding transfer line (or the first metal line; LINE1); and the gate of a transfer transistor, which is connected to each photodiode S of each of the pixels R, G, and B is connected to the second corresponding transfer transistor (or the second metal line; LINE2).

Figure 4:
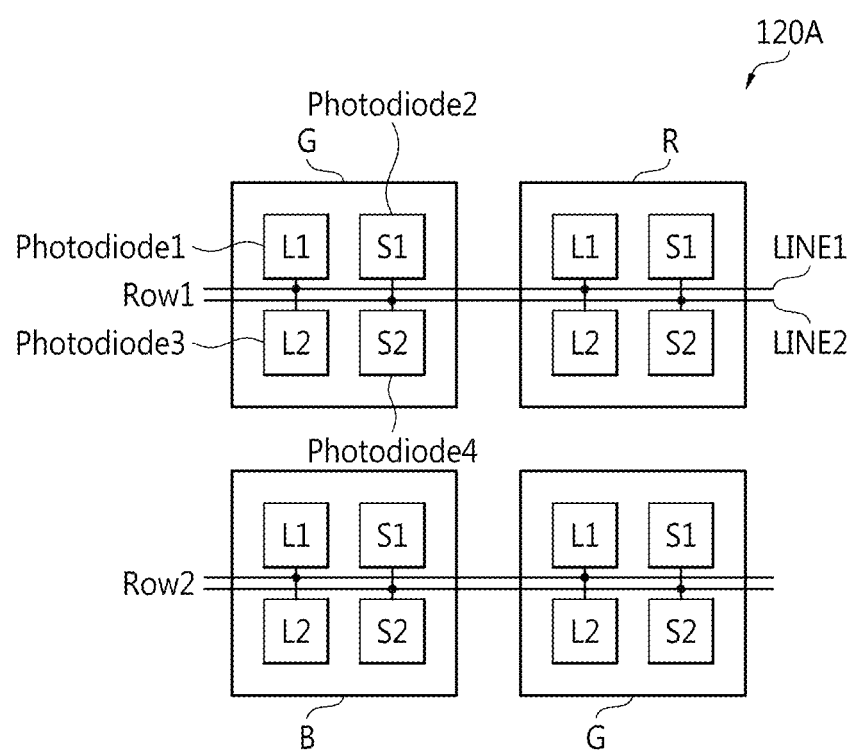
FIG. 4 shows a portion of the pixel array shown in FIG. 1 according to an example embodiment.

FIG. 4 shows a portion of the pixel array shown in FIG. 1 according to an example embodiment. FIG. 4 shows the portion 120A of the pixel array 100. Each of the pixels R, G, and B includes four photodiodes L1, L2, S1, and S2 which operate independently from each other.

According to an example embodiment, exposure time or integration time of each of the photodiodes L1, L2, S1, and S2 included in each of the pixels R, G, and B may be controlled to be different from each other in an independent manner by a row driver.

According to another example embodiment, exposure time or integration time of each of the photodiodes L1 and L2 included in each of the pixels R, G, and B may be controlled to be the same as each other by a row driver, and exposure time or integration time of each of photodiodes S1 and S2 included in each of the pixels R, G, and B may be controlled to be the same as each other by the row driver.

The exposure time or the integration time of each of the photodiodes L1 and L2 may be set to be longer than the exposure time or the integration time of each of the photodiodes S1 and S2.

Physical characteristics of each of the photodiodes L1 and L2 may be the same as or different from each other. Moreover, physical characteristics of each of the photodiodes S1 and S2 may be the same as or different from each other.

L1 means a first photodiode, S1 means a second photodiode, L2 means a third photodiode, and S2 means a fourth photodiode.

For example, each of L1 and L2 may be a photodiode which can generate a long-exposure image signal, and each of S1 and S2 may be a photodiode which can generate a short-exposure image signal.

Each of the pixels G and R disposed in a row Row1 includes four photodiodes L1, L2, S1, and S2. Each of the pixels B and G disposed in a row Row2 includes four photodiodes L1, L2, S1, and S2.

Each of the pixels R, G and B includes two photodiodes L1 and L2 which can generate long-exposure image signals, and includes two photodiodes S1 and S2 which can generate short-exposure image signals. According to one or more example embodiments, a position of each of the photodiodes L1, L2, S1, and S2 may be variously changed according to a design specification.

For example, a gate of each transfer transistor connected to each of the photodiodes L1 and L2 of each of the pixels R, G, and B disposed in each of the rows Row1 and Row2 is connected to the first corresponding transfer line (or the first metal line; LINE1), and a gate of each transfer transistor connected to each of the photodiodes S1 and S2 of each of the pixels R, G, and B is connected to the second corresponding transfer line (or the second metal line; LINE2) as shown in FIG. 4.

Figure 5:
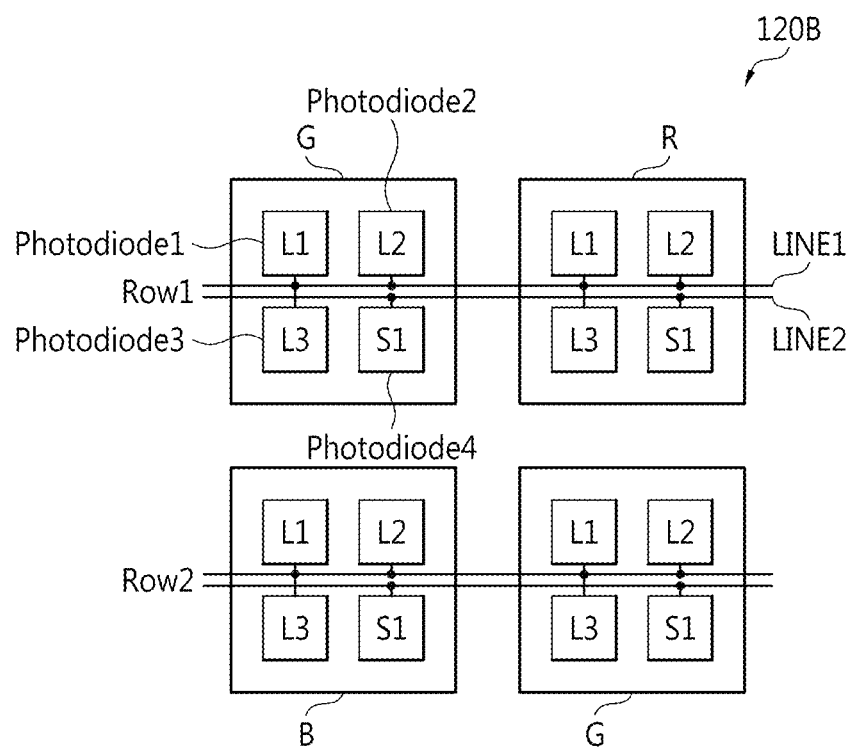
FIG. 5 shows a portion of the pixel array shown in FIG. 1 according to an example embodiment.

FIG. 5 shows a portion of the pixel array shown in FIG. 1 according to an example embodiment. FIG. 5 shows a portion 120B of the pixel array 100. Each of the pixels and B includes four photodiodes L1, L2, L3, and S1 which operate independently from each other.

That is, each of the pixels R, G, and B includes three photodiodes L1, L2, and L3 which can generate long-exposure image signals, and includes one photodiode S1 which can generate short-exposure image signals. According to one or more example embodiments, a position of each of the photodiodes L1, L2, L3, and S1 may be variously changed according to the design specification.

According to an example embodiment, exposure time or integration time of each of the photodiodes L1, L2, L3, and S1 included in each of the pixels R, G, and B may be controlled to be different from each other in an independent manner by the row driver.

According to another example embodiment, exposure time or integration time of each of the photodiodes L1, L2, and L3 included in each of the pixels R, G, and B may be controlled to be the same as each other by the row driver. The exposure time or integration time of each of the photodiodes L1, L2, and L3 may be set to be longer than the exposure time or integration time of the photodiode S1.

Physical characteristics of each of the photodiodes L1, L2, and L3 may be the same as or different from each other.

L1 represents a first photodiode, L2 represents a second photodiode, L3 represents a third photo diode, and S1 represents a fourth photo diode. For example, each of the photodiodes L1, L2, and L3 may be a photodiode which can generate long-exposure image signal, and the photodiode S1 may be a photodiode which can generate short-exposure image signal.

Each of the pixels G and R disposed in a row Row1 includes four photodiodes L1, L2, L3, and S1. Each of the pixels B and G disposed in a row Row2 includes four photodiodes L1, L2, L3, and S1.

For example, a gate of each transfer transistor connected to each of the photodiodes L1, L2, and L3 of each of the pixels R, G, and B disposed in each of the rows Row1 and Row2 is connected to the first corresponding transfer line (or the first metal line; LINE1), and a gate of each transfer transistor connected to the photodiodes S1 of each of the pixels R, and B is connected to the second corresponding transfer line (or the second metal line; LINE2) as shown in FIG. 5.

Figure 6:
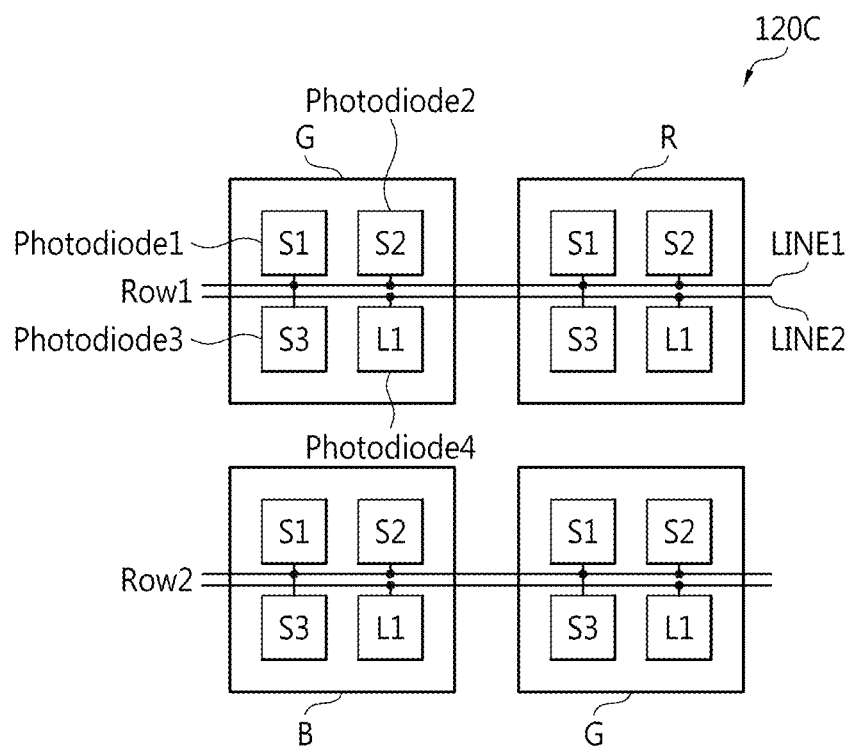
FIG. 6 shows a portion of the pixel array shown in FIG. 1 according to an example embodiment.

FIG. 6 shows a portion 120C of the pixel array 100 shown in FIG. 1. Each of the pixels R, G and B includes four photodiodes S1, S2, S3, and L1 which operate independently from each other.

That is, each of the pixels R, G, and B includes one photodiode L1 which can generate long-exposure image signals, and includes three photodiodes S1, S2, and S3 which can generate short-exposure image signals, respectively. According to one or more embodiments, a position of each of the photodiodes S1, S2, S3, and L1 may be variously changed according to the design specification.

According to an example embodiment, exposure time or integration time of each of the photodiodes S1, S2, S3, and L1 included in each of the pixels R, G, and B may be controlled to be different from each other in an independent manner by the row driver.

According to another example embodiment, exposure time or integration time of each of the photodiodes S1, S2, and S3 included in each of the pixels R, G, and B may be controlled to be the same as each other by the row driver.

Physical characteristics of each of the photodiodes S1, and S3 may be embodied to be the same as or different from each other.

S1 means a first photodiode, S2 means a second photodiode, S3 means a third photodiode, and L1 means a fourth photodiode.

For example, the photodiode L1 may be a photodiode which can generate long-exposure image signal, each of the photodiodes S1, S2, and S3 may be a photodiode which can generate short-exposure image signal.

Each of the pixels G and R disposed in a row Row1 includes four photodiodes S1, S2, S3, and L1. Each of the pixels B and G disposed in a row Row2 includes four photodiodes S1, S2, S3, and L1.

For example, a gate of each transfer transistor connected to each of the photodiodes S1, S2, and S3 of each of the pixels R, G, and B disposed in each of the rows Row1 and Row2 is connected to the first corresponding transfer line (or the first metal line; LINE1), and a gate of a transfer transistor connected to the photodiode L1 of each of the pixels R, G, and B is connected to the second corresponding transfer line (or the second metal line; LINE2) as shown in FIG. 6.

Figure 7:
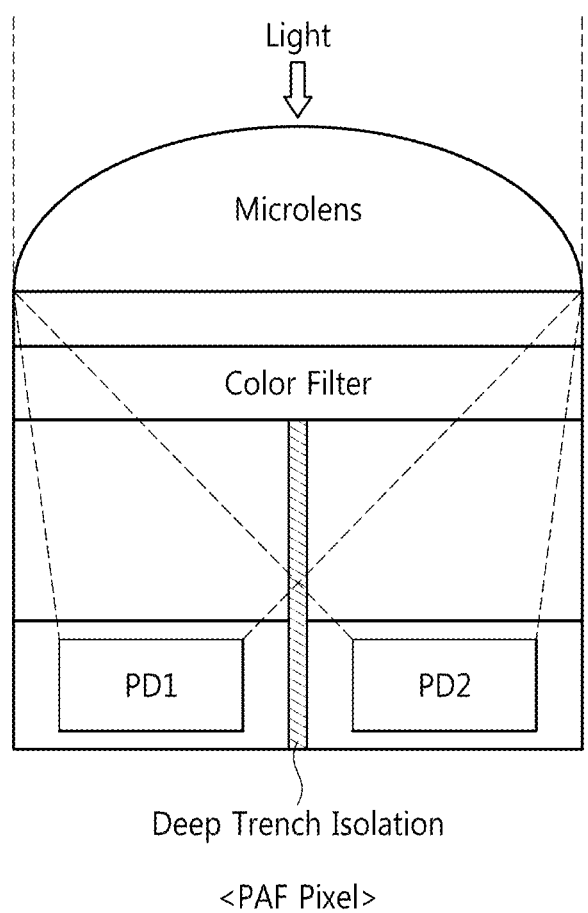
FIG. 7 shows a cross-sectional view of a pixel includes photodiodes according to an example embodiment.

FIG. 7 shows a cross-sectional view of a pixel which includes two photodiodes, according to an example embodiment. As shown in FIG. 7, the two photodiodes are PD1 and PD2. The pixel may be R, G, or B of FIG. 1.

A photodiode PD1 may be one of a photodiode which can generate long-exposure image signal and a photodiode which can generate short-exposure image signal, and a photodiode PD2 may be the other of the photodiode which can generate long-exposure image signal and the photodiode which can generate short-exposure image signal.

Two photodiodes PD1 and PD2 may be formed in a silicon substrate, and deep trench isolation (DTI) may be formed between two photodiodes PD1 and PD2. For example, in-pixel DTI may be formed between the two photodiodes PD1 and PD2, and inter-pixel DTI may be formed between pixels.

A metal wiring, a multi-layer wiring, or wiring layers may be formed in a circuit region formed between the two photodiodes PD1 and PD2 and a color filter.

A lens buffer or a planarization layer may be formed between a microlens and the color filter.

Figure 8:
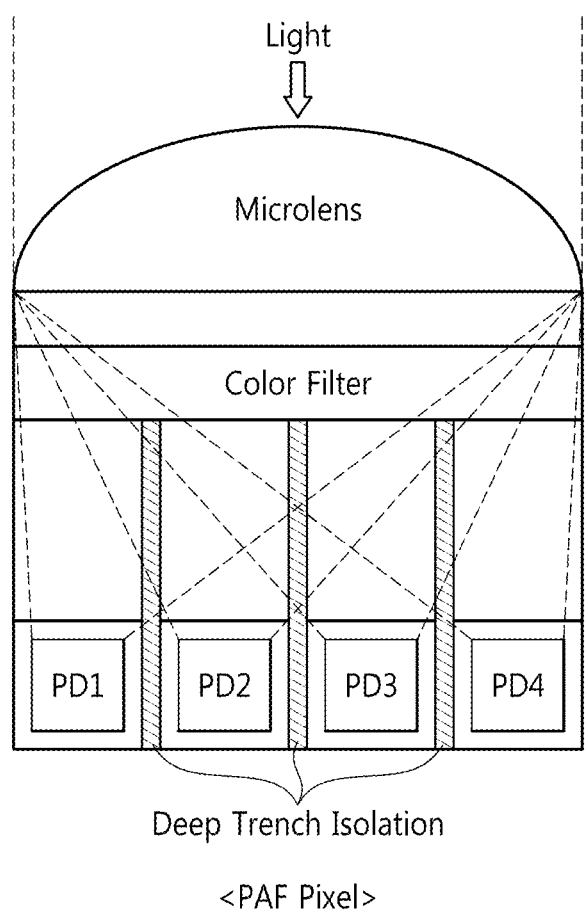
FIG. 8 shows a cross-sectional view of a pixel including four photodiodes according to an example embodiment.

FIG. 8 shows a cross-sectional view of a pixel including four photodiodes, according to an example embodiment. As shown in FIG. 8, the four photodiodes are PD1 to PD4. The pixel may be R, G or B of FIG. 1.

Referring to FIGS. 4 and 8, the photodiode PD1 is one of the photodiodes L1, S1, L2, and S2, the photodiode PD2 is another of the photodiodes L1, S1, L2, and S2, the photodiode PD3 is still another of the photodiodes L1, S1, L2, and S2, and the photodiode PD4 is the other of the photodiodes L1, S1, L2, and S2.

Referring to FIGS. 5 and 8, the photodiode PD1 is one of the photodiodes L1, L2, L3, and S1, the photodiode PD2 is another of the photodiodes L1, L2, L3, and S1, the photodiode PD3 is still another of the photodiodes L1, L2, L3, and S1, and the photodiode PD4 is the other of the photodiodes L1, L2, L3, and S1.

Referring to FIGS. 6 and 8, the photodiode PD1 is one of the photodiodes S1, S2, S3, and L1, the photodiode PD2 is another of the photodiodes S1, S2, S3, and L1, the photodiode PD3 is still another of the photodiodes S1, S2, S3, and L1, and the photodiode PD4 is the other of the photodiodes S1, S2, S3, and L1.

Four photodiodes PD1 to PD4 are formed in a silicon substrate, and a corresponding DTI, e.g., an in-pixel DTI, may be formed between two photodiodes PD1 and PD2, PD2 and PD3, and PD3 and PD4. An inter-pixel DTI may be formed between pixels.

A metal wiring, a multi-layer wiring, or wiring layers may be formed in a circuit region formed between the four photodiodes PD1 to PD4 and a color filter.

A lens buffer or a planarization layer may be formed between a microlens and a color filter.

Figure 9:
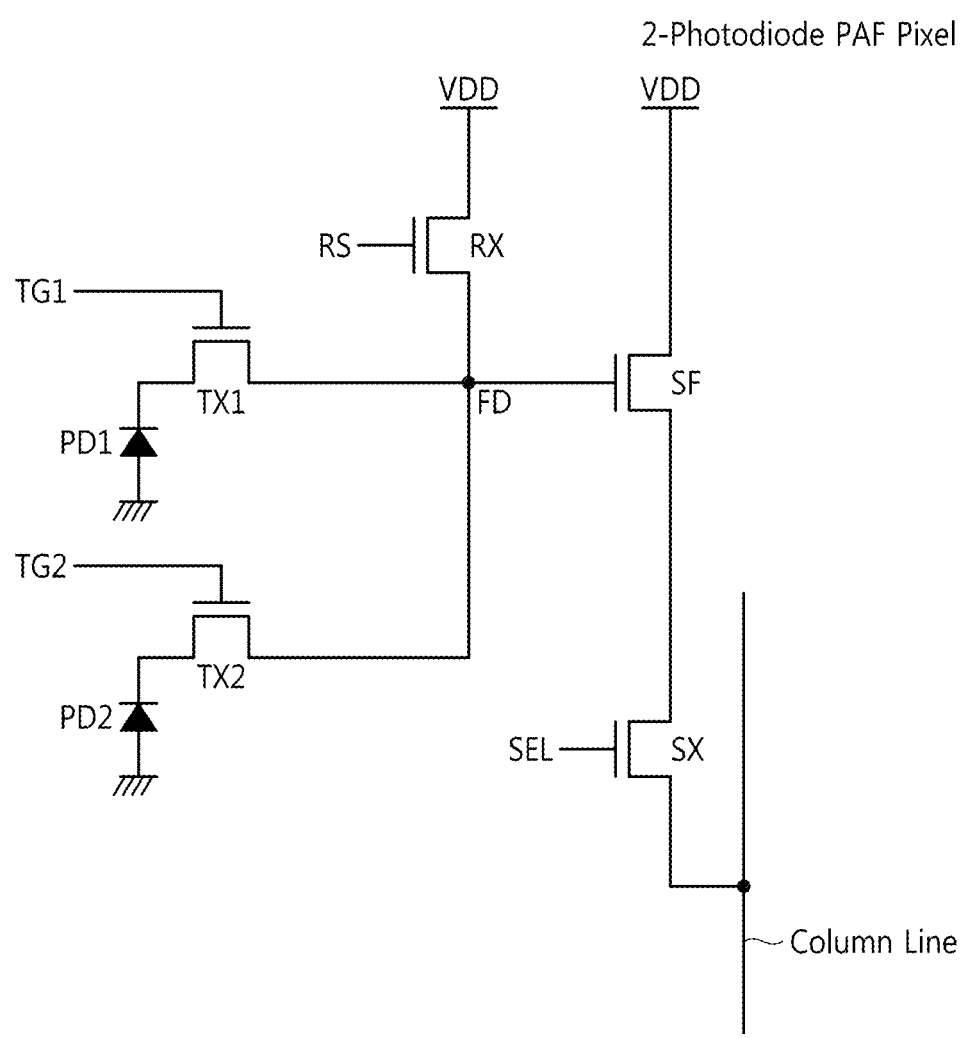
FIG. 9 shows a circuit diagram of a pixel, e.g., a PAF pixel, including two photodiodes according to an example embodiment.

FIG. 9 shows a circuit diagram of a pixel, e.g., a PAF pixel, including two photodiodes according to an example embodiment. As shown in FIG. 9, the two photodiodes are PD1 and PD2. Referring to FIGS. 2, 3, 7, and 9, a pixel includes two photodiodes PD1 and PD2, two transfer transistors TX1 and TX2, a reset transistor RX, a source follower SF, and a selection transistor SX.

Each of control signals TG1, TG2, RS, and SEL which can control each of transistors TX1, TX2, RX, and SX may be output from the row driver. An output signal of a selection transistor SX is supplied to a column line.

For convenience of description in FIG. 9, a pixel which has a shared floating diffusion region (FD) is shown; however, pixels which distinguish a long exposure and a short exposure according to an intention of a designer may not share one floating diffusion region (FD) by each photodiode PD1 and PD2.

Figure 10:
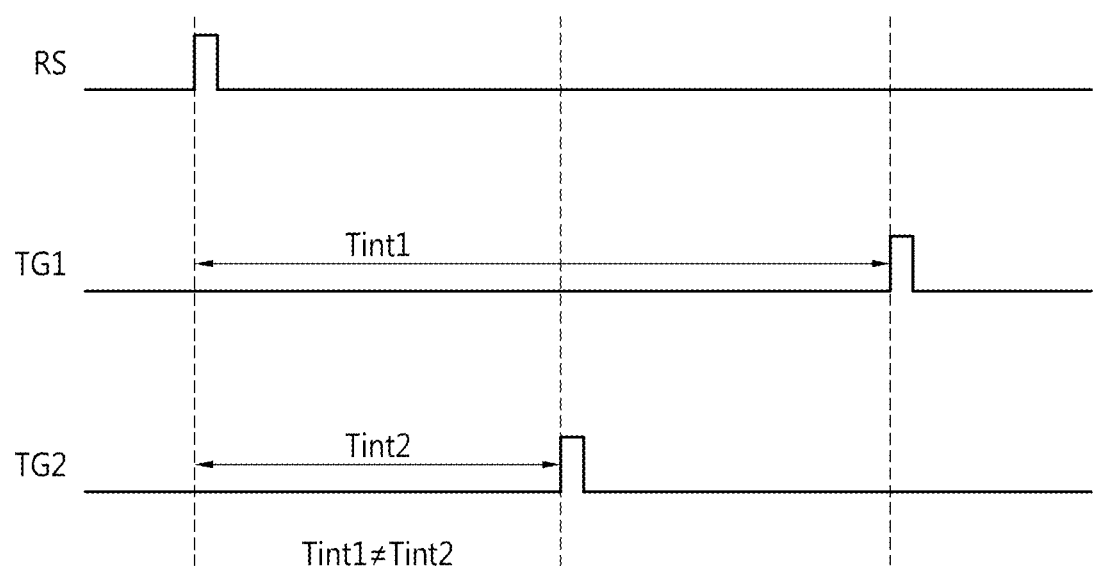
FIG. 10 is a timing diagram which describes an operation of the pixel shown in FIG. 9 according to an example embodiment.

FIG. 10 is a timing diagram which describes an operation of the pixel shown in FIG. 9 according to an example embodiment.

Referring to FIGS. 9 and 10, when a reset signal RS is supplied to a gate of a reset transistor RX, the floating diffusion region (FD) is reset by the reset transistor RX.

When the photodiode PD1 is a photodiode which can generate a long-exposure image signal, and the photodiode PD2 is a photodiode which can generate a short-exposure image signal, exposure time or integration time Tint1 determined by a first transfer control signal T1 is longer than exposure tune or integration time Tint2 determined by a second transfer control signal TG2.

Figure 11:
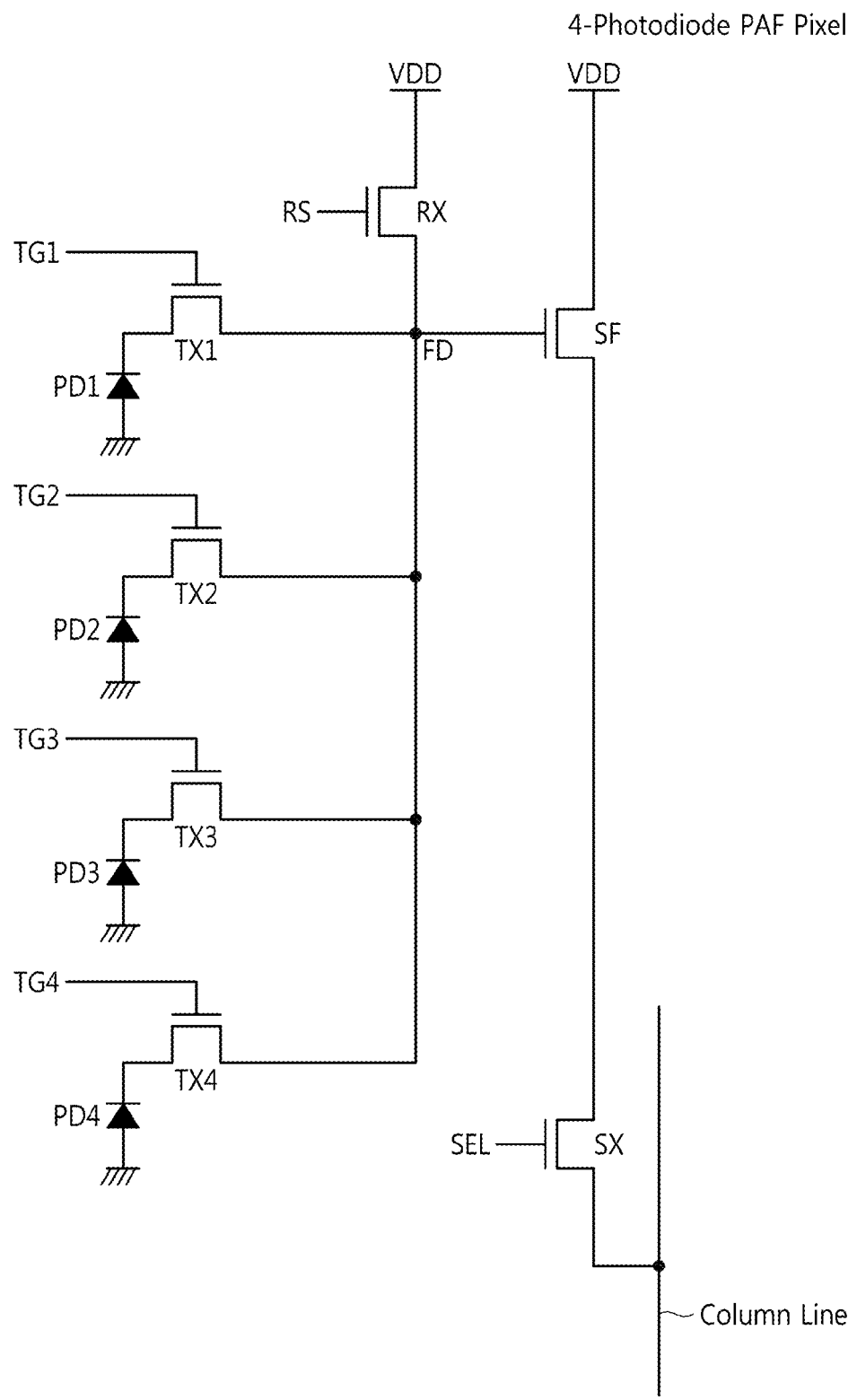
FIG. 11 is a circuit diagram of a pixel, e.g., a PAF pixel, including four photodiodes according to an example embodiment.

FIG. 11 is a circuit diagram of a pixel, e.g., a PAF pixel, including four photodiodes according to an example embodiment. As shown in FIG. 11, the four photodiodes are PD1 to PD4. Referring to FIGS. 4, 5, 6, 8, and 11, the pixel includes four photodiodes PD1 to PD4, four transfer transistors TX1 to TX4, a reset transistor RX, a source follower SF, and a selection transistor SX.

Each of the control signal TG1 to TG4, RS, and SEL which can control each of the transistors TX1 to TX2, RX, and SX may be output from the row driver. An output signal of the selection transistor SX is supplied to a column line.

For convenience of description in FIG. 11, a pixel which has a shared floating diffusion region (ED) is shown; however, pixels which distinguish a long exposure and a short exposure according to an intention of a designer may not share one floating diffusion region (FD) by each of the photodiodes PD1 to PD4.

Figure 12:
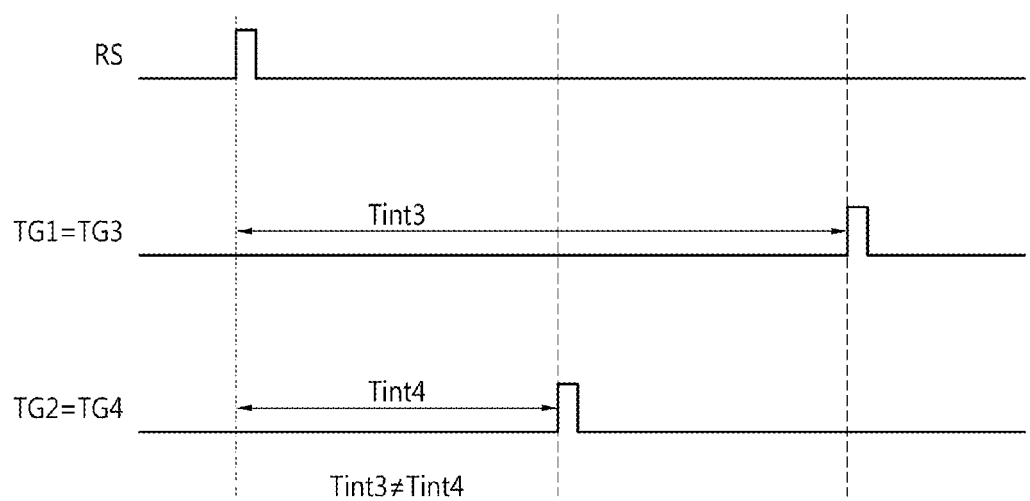
FIG. 12 is a timing diagram which describes an operation of the pixel shown in FIG. 11 according to an example embodiment.

FIG. 12 is a timing diagram which describes an operation of the pixel shown in FIG. 11 according to an example embodiment.

Referring to FIGS. 4, 11, and 12, when a reset signal RS is supplied to a gate of the reset transistor RX, the floating diffusion region FD is reset by the reset transistor RX.

When each of the photodiodes PD1 and PD3 is a photodiode (e.g., L1 and L2) which can generate a long-exposure image signal, and each of the photodiodes PD2 and PD4 is a photodiode (e.g., S1 and S2) which can generate a short-exposure image signal, exposure time or integration time Tint1 determined by each of the first transfer signals TG1 and TG3 is longer than exposure time or integration time Tint2 determined by each of the second transfer control signals TG2 and TG4.

Figure 13:
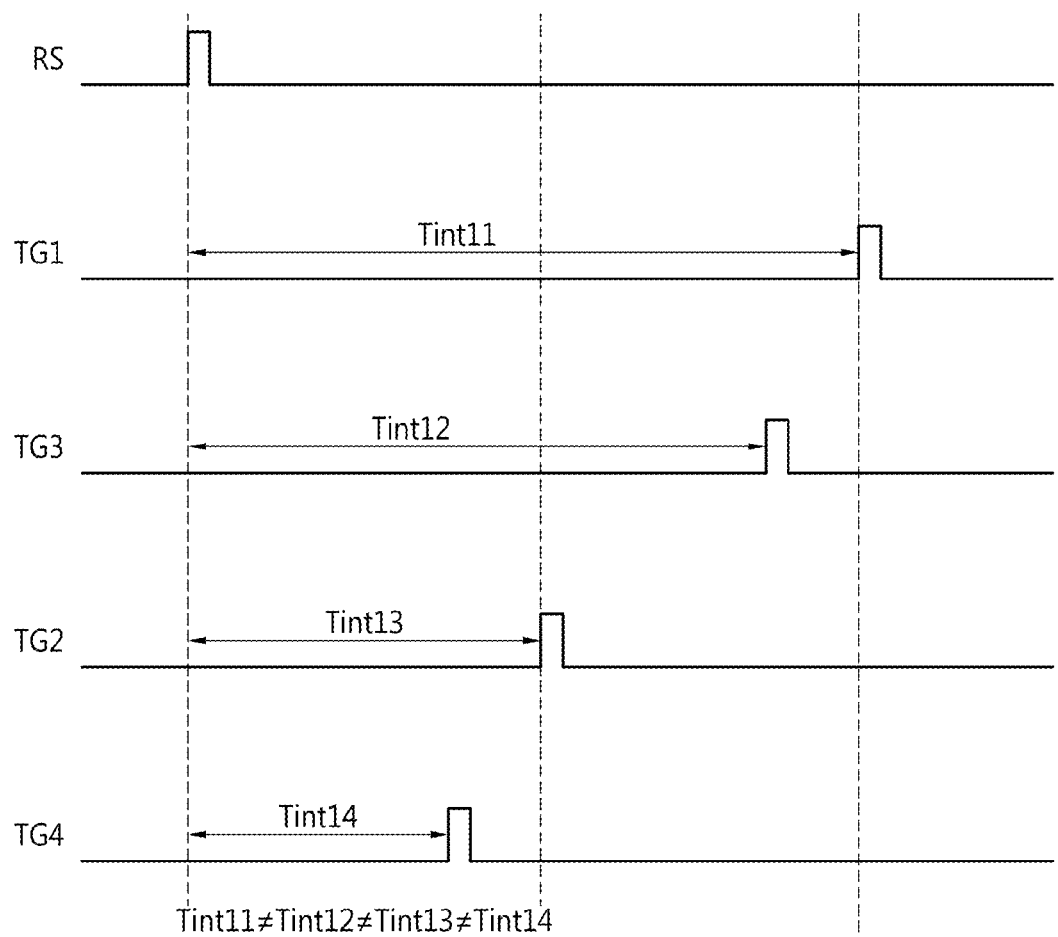
FIG. 13 is another timing diagram which describes the operation of the pixel shown in FIG. 11 according to an example embodiment.

FIG. 13 is another timing diagram which describes the operation of the pixel shown in FIG. 11 according to an example embodiment. Referring to FIGS. 4 to 6, 11, and 13, when the reset signal RX is supplied to the gate of the reset transistor RX, the floating diffusion region (FD) is reset by the reset transistor RX.

Exposure time or integration times Tint11 to Tint14 determined by each of the transfer control signals TG1 to TG4 transferred through a transfer line may be different from each other.

Figure 14:
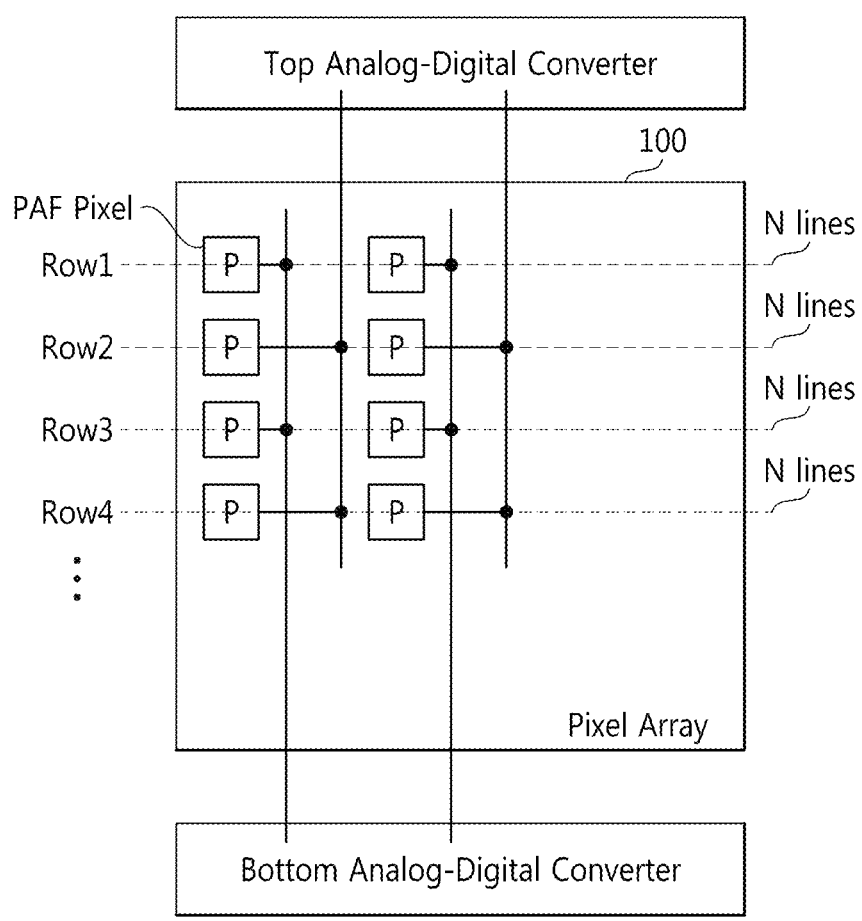
FIG. 14 is a block diagram of an image sensor including the pixel array of FIG. 1 according to an example embodiment.

FIG. 14 is a block diagram of an image sensor including the pixel array of FIG. 1 according to an example embodiment.

A structure of each PAF pixel P included in the pixel array is substantially the same as a structure of a pixel described referring to FIGS. 2 to 8. The PAT pixel P represents R, or B.

An output signal of each PAF pixel P arranged in odd numbered rows Row1, Row3, . . . , is transferred to a bottom analog-digital converter. Digital signals output from the bottom analog-digital converter may be stored in a corresponding memory or buffer.

An output signal of each PAF pixel P arranged in even numbered rows Row2, Row4, . . . , is transferred to a top analog-digital converter. Digital signals output from the top analog-digital converter may be stored in a corresponding memory or buffer.

As shown in FIG. 14, when each pixel P includes a plurality of photodiodes, N transfer lines which can transfer N control signals controlling exposure time or integration time of the plurality of photodiodes included in each pixel P may be embodied.

Figure 15:
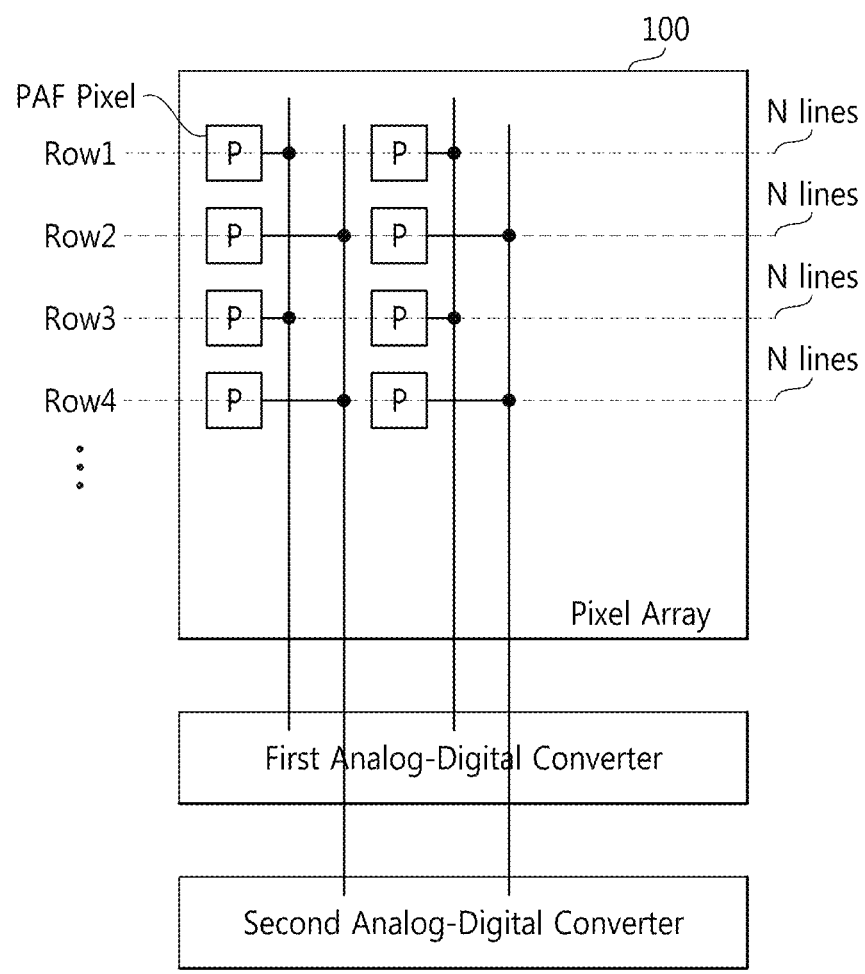
FIG. 15 is another block diagram of the image sensor including the pixel array of FIG. 1 according to an example embodiment.

FIG. 15 is another block diagram of the image sensor including the pixel array of FIG. 1 according to an example embodiment. A structure of each PAF pixel P included in the pixel array is substantially the same as a structure of the pixel described referring to FIGS. 2 to 8. The PAF pixel P represents R, G, or B.

An output signal of each PAF pixel P arranged in the odd numbered rows Row1, Row3, . . . , is transferred to a first analog-digital converter. Digital signals output from the first analog-digital converter may be stored in a corresponding memory or buffer. The memory or buffer may output image data.

An output signal of each PAF pixel P arranged in the even numbered rows Row2, Row4, . . . , is transferred to a second analog-digital converter. Digital signals output from the second analog-digital converter may be stored in a corresponding memory or buffer. The memory or buffer may output image data.

As shown in FIG. 15, when each pixel P includes a plurality of photodiodes, N transfer lines which can transfer N control signals controlling exposure time or integration time of the plurality of photodiodes included in each pixel P may be embodied.

Figure 16:
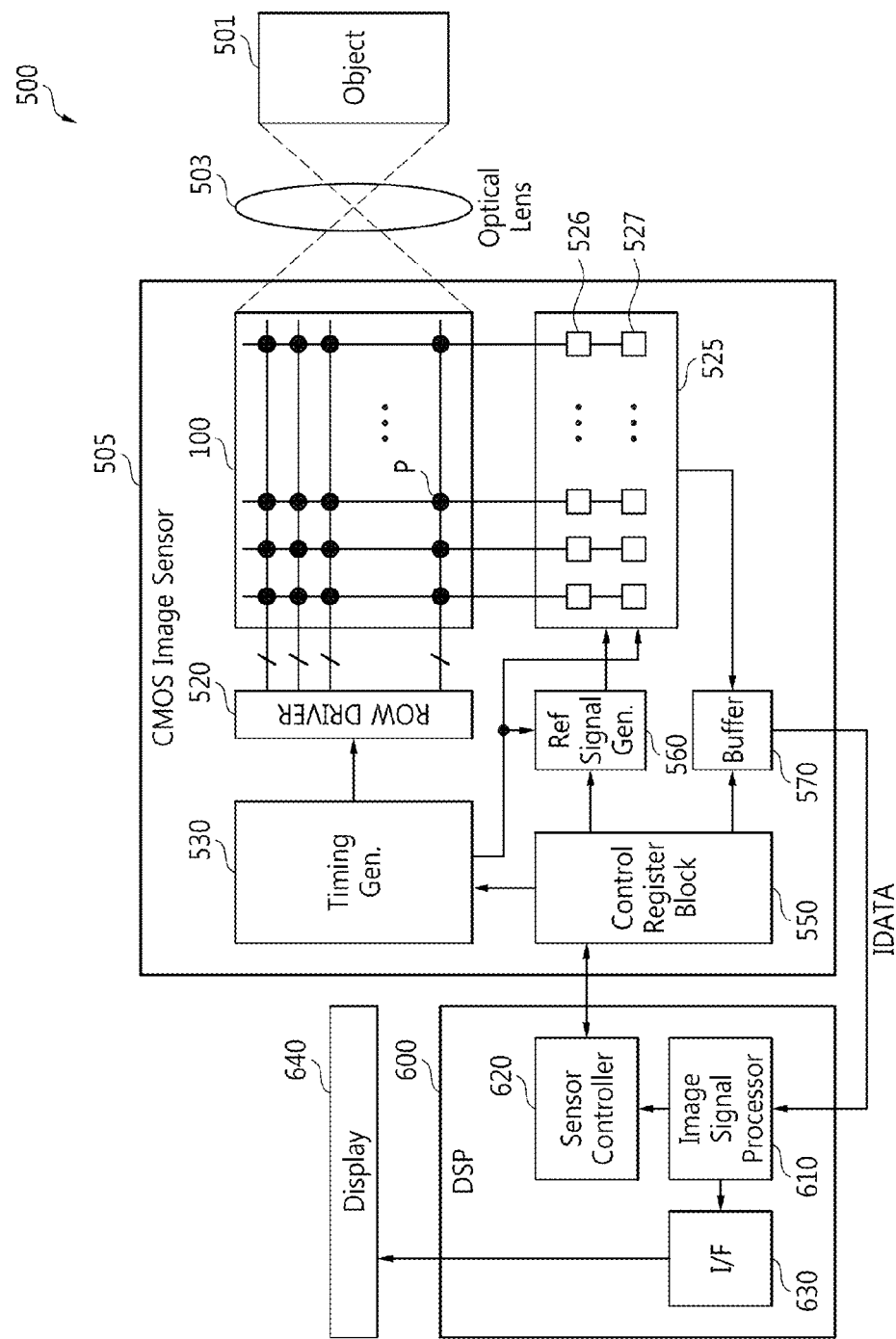
FIG. 16 is a block diagram according to an example embodiment of a data processing system including the pixel array shown in FIG. 1.

FIG. 16 is a block diagram according to an example embodiment of a data processing system including the pixel array shown in FIG. 1. Referring to FIGS. 1 to 13, and 16, the data processing system 500 may be embodied as a portable electronic device described above.

The data processing system 500 includes an optical lens 503, a CMOS image sensor 505, a digital signal processor (DSP) 600, and a display 640.

The CMOS image sensor 505 may generate image data IDATA of an object 501 incident through the optical lens 503. The image data IDATA are data corresponding to pixel signals output from the plurality of photodiodes P.

The CMOS image sensor 505 includes the pixel array 100, a row driver 520, a readout circuit 525, a timing generator 530, a control register block 550, a reference signal generator 560, and a buffer 570.

The pixel array 100 includes a plurality of pixels P. The pixel P of the CMOS image sensor 505 may be manufactured using a CMOS manufacture process. As described referring to FIGS. 1 to 13, each of the plurality of pixels P may include one or more photodiodes.

The pixel array 100 includes pixels P arranged in a matrix shape. The pixels P transfer pixel signals to column lines.

The row driver 520 drives control signals to the pixel array 100 for controlling an operation of each of the pixels P according to a control of the timing generator 530.

The row driver 520 may function as a control signal generator which can generates control signals. For example, the control signals may include the control signals RS, TG1, TG2, and SEL shown in FIGS. 9 and 10, or may include the control signals RS, TG1 to TG4, and SEL shown in FIGS. 11 to 13.

The timing generator 530 controls an operation of the row driver 520, the readout circuit 525, and the reference signal generator 560 according to a control of the control register block 550.

The readout circuit 525 includes the analog-digital converter 526 on a column basis and a memory 527 on a column basis. According to an example embodiment, the analog-digital converter 526 may perform a function of correlated double sampling (CDS).

The read out circuit 525 outputs a digital image signal corresponding to a pixel signal output from each pixel P.

The control register block 550 controls an operation of the timing generator 530, the reference signal generator 560, and the buffer 570 according to a control of the DSP 600.

The buffer 570 transfers image data IDATA corresponding to a plurality of digital image signals output from the readout circuit 525 to the DSP 600.

The image data IDATA include first image data corresponding to long-exposure image signals and second image data corresponding to short-exposure image signals.

The DSP 600 includes an image signal processor (ISP) 610, a sensor controller 620, and an interface 630. The ISP 610 controls the sensor controller 620 which controls the control register block 550, and the interface 630.

According to an example embodiment, the CMOS image sensor 505 and the DSP 600 may be embodied in one package, e.g., a multi-chip package (MCP).

The CMOS image sensor 505 and the ISP 610 are separated from each other in FIG. 16; however, the ISP 610 may be embodied as a portion of the CMOS image sensor 505.

The ISP 610 processes the image data IDATA transferred from the buffer 570, and transfers processed image data to the interface 630. For example, the ISP 610 may interpolate image data IDATA corresponding to pixel signals output from the pixels P, and generate interpolated image data.

The sensor controller 620 may generate various control signals for controlling the control register block 550 according to a control of the ISP 610.

The interface 630 may transfer the image data processed SP 610, the interpolated image data, to the display 640.

The display 640 may display the interpolated image data output from the interface 630. The display 640 may be embodied in a thin film transistor-liquid crystal display (TFT-LCD), a light emitting diode (LED) display, an organic LED (OLED) display, an active-matrix OLED (AMOLED) display, or a flexible display.

Figure 17:
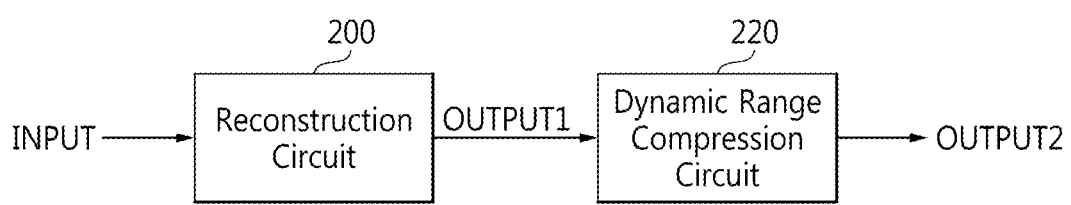
FIG. 17 is a schematic block diagram of the image signal processor (ISP) of FIG. 16 according to an example embodiment.

FIG. 17 is a schematic block diagram of the image signal processor (ISP) of FIG. 16, according to an example embodiment. FIG. 18 show exposure times and an amount of accumulated exposure light during one field in a CMOS image sensor shown in FIG. 16 according to an example embodiment. FIG. 19 shows input/output luminance characteristics of a long-exposure image signal and input/output luminance characteristics of a short-exposure image signal so as to describe a combining process of the long-exposure image signal and the short-exposure image signal according to one example embodiment.

Referring to FIG. 17, the ISP 610 of FIG. 16 may include a reconstruction circuit 200 and a dynamic range compression circuit 220.

A method of operating the reconstruction circuit 200 will be described referring to FIGS. 18A, 18B and 19.

Figure 18A:
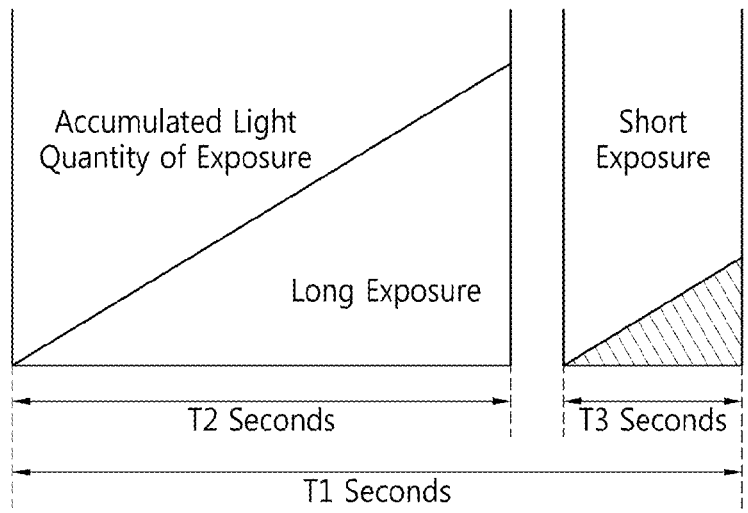
FIGS. 18A and 18B show exposure times and an amount of accumulated exposure light during one field in a CMOS image sensor shown in FIG. 16 according to an example embodiment.
Figure 19:
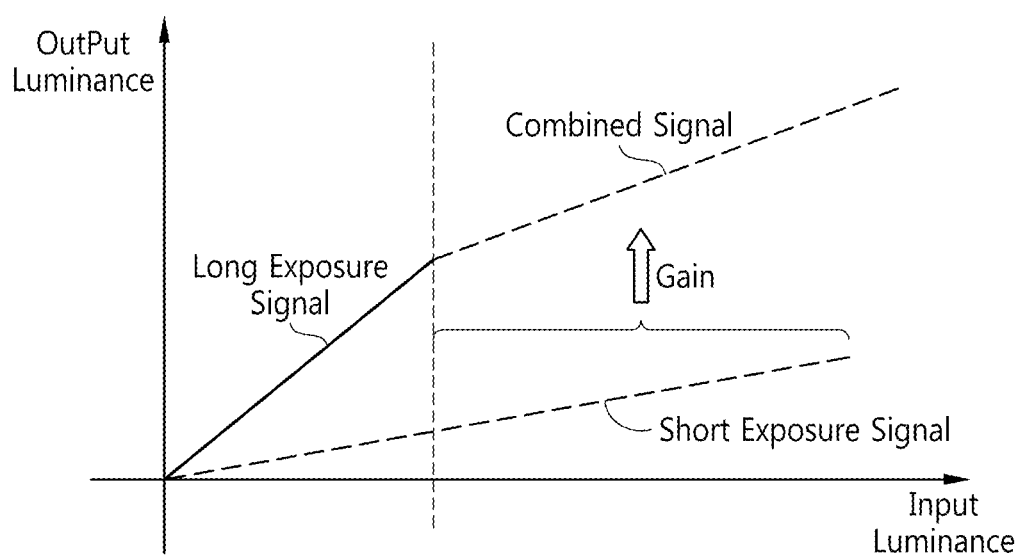
FIG. 19 shows input/output luminance characteristics of a long-exposure image signal and input/output luminance characteristics of a short-exposure image signal so as to describe a combining process of the long-exposure image signal and the short-exposure image signal according to an example embodiment.

Referring to FIG. 18A, a T2 second long-exposure and T3 second short-exposure formed in accordance with a field period of T1 seconds (e.g., 1/60 seconds) are performed. According to an example embodiment, a long-exposure time and the short-exposure time may be varied.

In order to perform a long exposure and a short exposure, the long-exposure image signal and the short-exposure image signal are acquired depending on the number of rows in one field period. In order to combine the long-exposure image signal and the short-exposure image signal, captured image data are generated depending on the number of rows in one field.

A combination of the long-exposure image signal and the short-exposure image signal may be performed by the reconstruction circuit 200 of FIG. 17. A combining process by the reconstruction circuit 200 will be described referring to FIG. 19.

According to an example embodiment, input image data INPUT may include long-exposure image signals corresponding to the first image data, and short-exposure image signals corresponding to the second image data.

In the combining process by the reconstruction circuit 200, a combined signal or combined image may be generated by switching signals or images at a switching point indicated by a luminance threshold expressed by a dotted line.

For example, a corresponding long-exposure image signal is applied to a pixel signal having a lower luminance level than a luminance level of the switching point, and a corresponding short-exposure image signal is applied to a pixel signal having a higher luminance level than the luminance level of the switching point.

Level matching between two images is performed by multiplying the short-exposure image signal by an exposure ratio or gain. For example, the exposure ratio or gain may be determined according to a ratio between the long-exposure image signal and the short-exposure image signal.

When the exposure ratio between the long-exposure image signal and the short-exposure image signal is exposure of the short-exposure image signal is 1/K of exposure of the long-exposure image signal. A luminance level of the long-exposure image signal is K times larger than a luminance level of the short-exposure image signal. Accordingly, two levels may be matched by multiplying the short-exposure image signal by a gain K.

In this manner, the short-exposure image signal is multiplied K times. As a result, a combined image having characteristics of the long-exposure signal and characteristics of a combined signal is generated.

That is, the reconstruction circuit 200 combines the input image data INPUT as described with reference to FIG. 19, and outputs a combined image OUTPUT1. The reconstruction circuit 200 may perform a function of linearly combining the short-exposure image signal (that is, a short exposure image) acquired through short exposure and the long-exposure image signal (that is, a long exposure image) acquired through long exposure.

The reconstruction circuit 200 multiplies the short exposure image by the exposure ratio, and then generates a linear image OUTPUT1 by linearly combining an image generated as a result of the multiplication and the long exposure image. For example, when the first image data corresponding to the long-exposure image signals are M-bits (for example, 14-bits), and the second image data corresponding to the short-exposure image signals are M-bits (for example, 14-bits), the first image data and the second image data are overlapped with each other in a certain section, and an overlapped combined image OUTPUT1 becomes smaller than 2*M bits. For example, the overlapped combined image OUTPUT1 may be 14-bits. Here, each bit number means a bit number of image data corresponding to each pixel signal output from each pixel.

The dynamic range compression circuit 220 lowers the bit number (e.g., 14-bits) of the overlapped combined image OUTPUT1 to a bit (e.g., 10-bits) for a display or an output standard, and outputs an image OUTPUT2 with a lowered bit number. For example, the dynamic range compression circuit 220 reduces the bit number of the combined image OUTPUT1 using a curve such the well-known gamma connection (e.g., embodied in a local method or a global method), and outputs an output image OUTPUT2 with a reduced bit. For example, the dynamic range compression circuit 220 may perform a function of compressing a dynamic range of the combined image OUTPUT1.

Figure 18B:
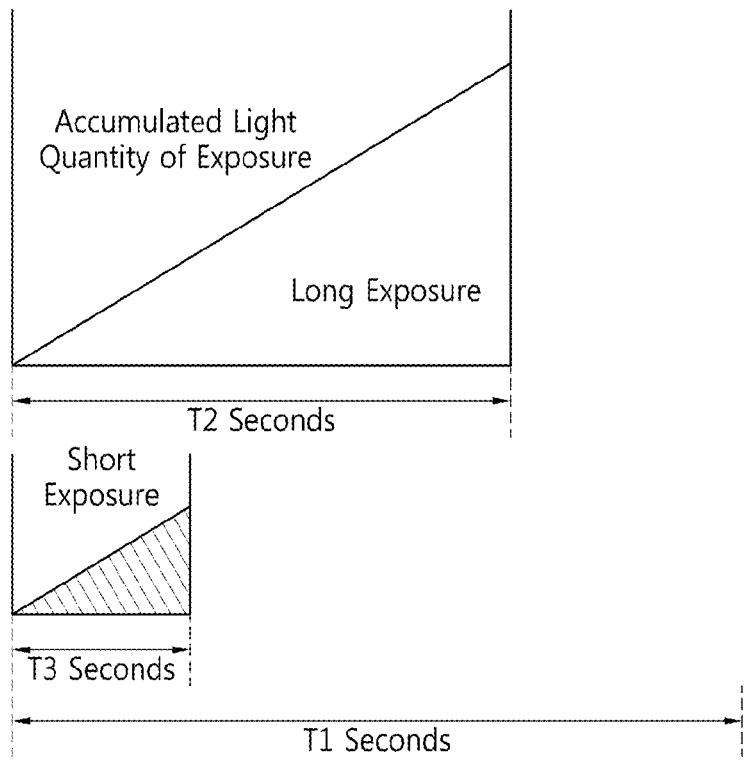

FIG. 18B describes a rolling shutter method, and long exposure and short exposure may be overlapped with each other to proceed in FIG. 18B. T2 and T3 may be dependent on the number of rows.

Figure 20:
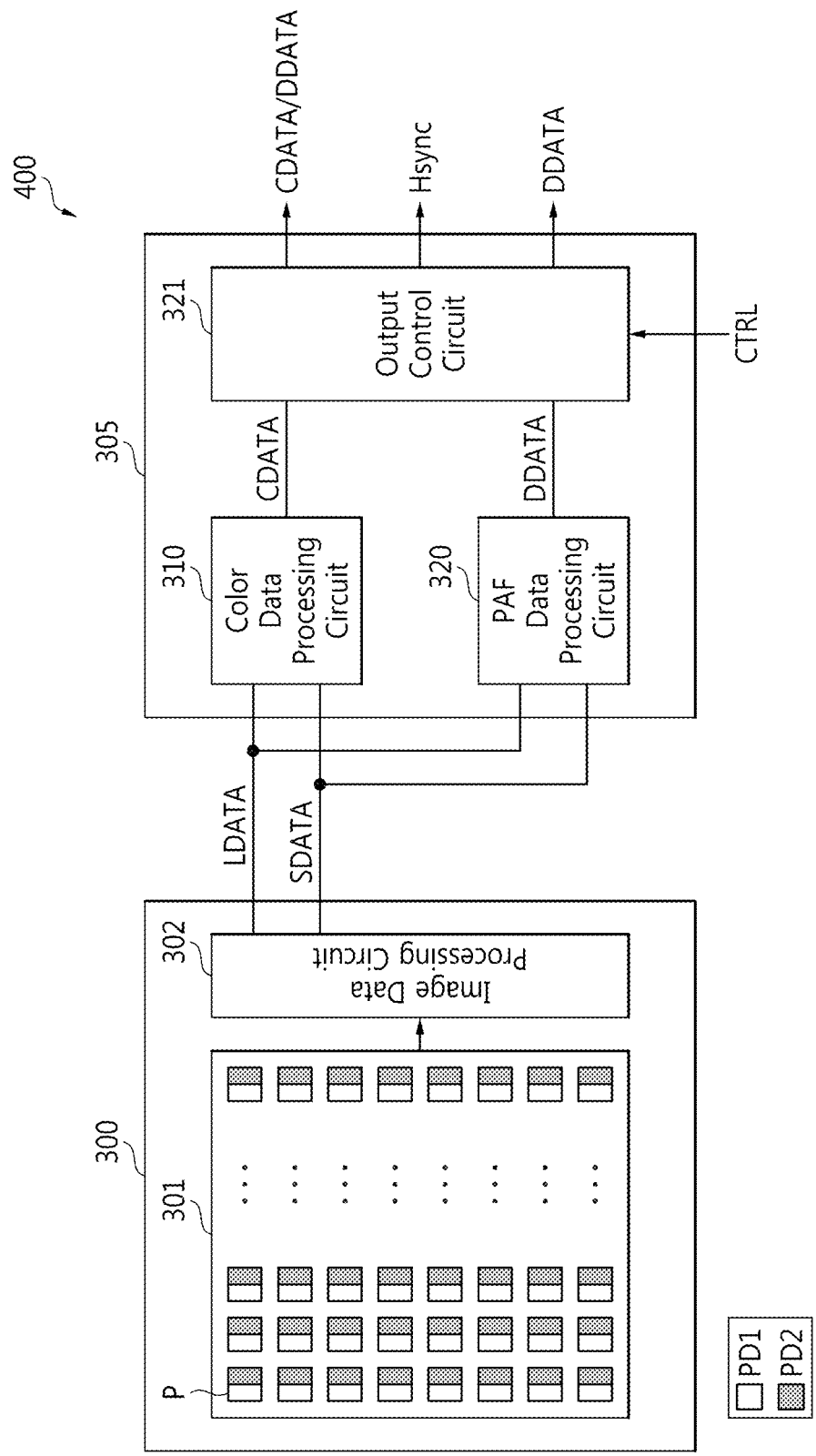
FIG. 20 is a block diagram of a data processing device according to an example embodiment of the present inventive concepts.

FIG. 20 is a block diagram of a data processing device according to an example embodiment of the present inventive concepts. Referring to FIG. 20, a data processing device 400 may include an image sensor 300 and a processing circuit 305.

The data processing device 400 may be a mobile computing device. The mobile computing device may be a laptop computer, a mobile phone, a smart phone, a tablet PC, a personal digital assistant (PDA), an enterprise digital assistant (EDA), a digital still camera, a digital video camera, a portable multimedia player (PMP), a personal navigation device or portable navigation device (PND), a handheld game console, a mobile internet device (MID), a wearable computer, an internet of things (IoT) device, an internet of everything (IoE) device, an e-book, or a drone.

The image sensor 300 may be an image sensor chip or an image sensor package. For example, an image sensor chip may be manufactured using a CMOS process. The image sensor 300 may include a pixel array 301 and an image data processing circuit 302. A structure of the pixel array 301 may be substantially the same as or similar to a structure of the pixel array 100 of FIG. 16. The image sensor 300 may be the CMOS image sensor 505 of FIG. 16.

The pixel array 301 may include pixels P two-dimensionally arrayed to capture an image. Each of the pixels P included in the pixel array 301 may include a plurality of photoelectric conversion elements. Each pixel P may include a first photoelectric conversion element PD1 and a second photoelectric conversion element PD2 as shown in FIG. 7. As shown in FIG. 20, when each of the pixels P included in the pixel array 301 includes a plurality of photoelectric conversion elements, the pixel array 301 may be referred to as a full PAF pixel array.

One of the first photoelectric conversion element PD1 and the second photoelectric conversion element PD2 may generate a long-exposure image signal, and the other of the first photoelectric conversion element PD1 and the second photoelectric conversion element PD2 may generate a short-exposure image signal. Each pixel P including every two photoelectric conversion elements PD1 and PD2 is shown in FIG. 20; however, each of the pixels P included in the pixel array 301 may include four photoelectric conversion elements PD1 to PD4 as shown in FIG. 8.

The image sensor 300 may further include a row driver, e.g., 520 of FIG. 16, which can independently control exposure time of each of the photoelectric conversion elements PD1 and PD2 included in each pixel P.

The image sensor 300 may be a multi-photodiode PAF sensor, and output signals of the multi-diode PAF sensor 300 may be phase difference signals, that is, signals output from a plurality of photoelectric conversion elements (e.g., photodiodes) included in each pixel P. As described referring to FIGS. 1 to 10, each pixel P may include a plurality of photodiodes which operate independently from each other and have different exposure time or integration time.

The image data processing circuit 302 may generate image data from pixel signals output from the pixels P. For example, the image data processing circuit 302 may include elements 520, 525, 530, 550, 560, and 570 shown in FIG. 16.

The processing circuit 305 may include a color data processing circuit 310, a depth data processing circuit 320, and an output control circuit 321.

The color data processing circuit 310 may extract color data CDATA from image data output from the image data processing circuit 302, and output extracted color data CDATA. The image data may include long-exposure image data LDATA corresponding to long-exposure image signals output from the pixels P and short-exposure image data SDATA corresponding to short-exposure image signals output from the pixels P. For example, when WDR is applied, the image sensor 300 may output the long-exposure image data LDATA and the short-exposure image data SDATA.

The depth data processing circuit 320 may extract depth data DDATA from image data output from the image data processing circuit 302, and output extracted depth data DDATA.

The color data processing circuit 310 may perform processing for image data enhancement, e.g., pre-processing and/or main-color data processing, on a pixel basis using each of the image data LDATA and SDATA. The pre-processing may correct a problem generated in a manufacturing process of a CMOS image sensor before processing main-color data, e.g., RGB data. The correction may include lens shading correction and/or had pixel correction. The main-color data processing may include interpolation, noise reduction, edge enhancement, color correction, and/or gamma processing.

The depth data processing circuit 320 may be referred to as a PAF data processing circuit 320. The depth data processing circuit 320 may perform processing for depth data enhancement on a pixel basis using each of the image data LDATA and SDATA. The depth data processing circuit 320 may be a phase difference auto focus data processing, and perform a function of extracting disparity data from each of the image data LDATA and SDATA. The disparity data may be depth data. For example, the disparity data may be image data of one point acquired through photoelectric conversion elements included in the pixels P. The depth data processing circuit 320 may perform a series of processing, e.g., noise reduction, so as to obtain the disparity data.

Figure 21:
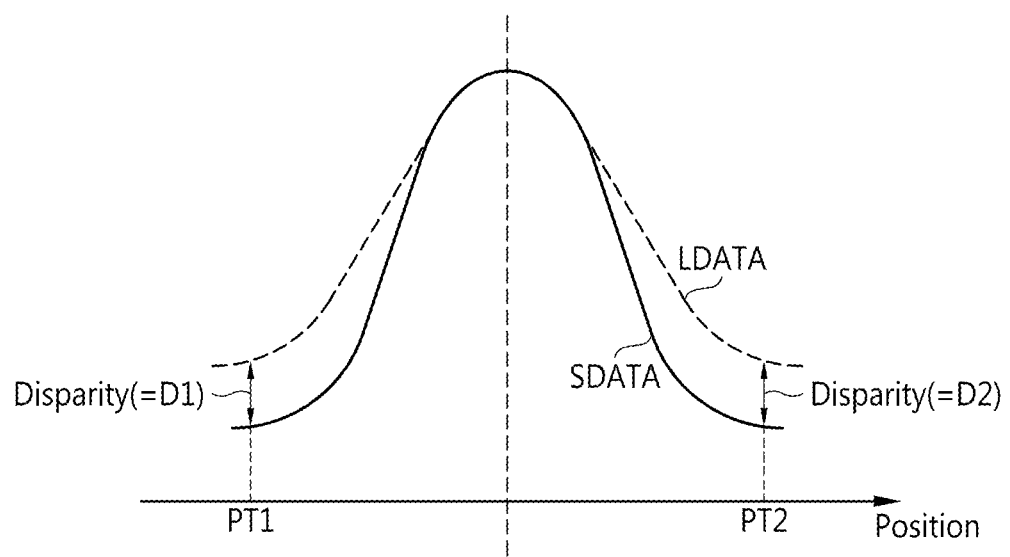
FIG. 21 is a conceptual diagram which describes a disparity according to a position of a pixel according to an example embodiment.

FIG. 21 is a conceptual diagram which describes a disparity according to a position of a pixel according to an example embodiment. Referring to FIG. 21, a first disparity data D1 for a first pixel position PT1 may be determined based on the long-exposure image data LDATA and the short-exposure image data SDATA. Moreover, a second disparity data D2 for a second pixel position PT2 may be determined based on the long-exposure image data LDATA and the short-exposure image data SDATA.

For example, each of the image data D1 and D2 may be expressed by S-bits. At this time, S is a natural number equal to or greater than two. For example, when each of the image data D1 and D2 is expressed by 8-bit, a disparity may be determined by a difference between a first data value of the long-exposure image data LDATA and a second data value of the short-exposure image data SDATA.

Each of the processing circuits 310 and 320 may be implemented in a pipeline structure.

An output control circuit 321 may control an output method and an output timing of color data CDATA and depth data DDATA in response to control signals CTRL. The output method may be a parallel output method or a serial output method. The output timing may mean which of the color data CDATA and the depth data DDATA to output first. The output method and the output timing will be described in detail referring to FIGS. 22 to 27.

Figure 22:
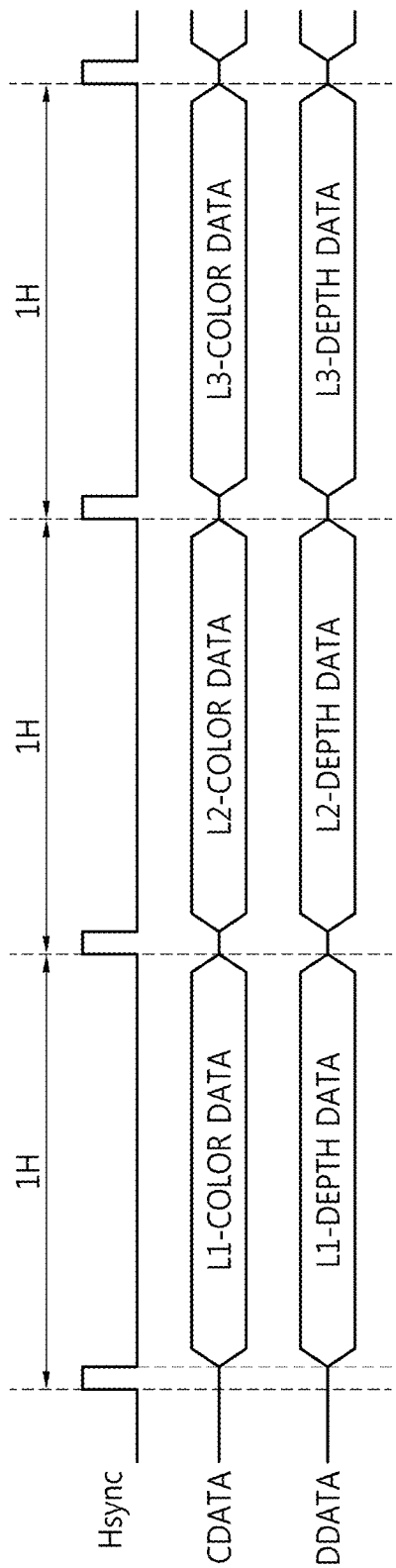
FIGS. 22 to 27 are timing diagrams of color data and depth data output from the processing circuit shown in FIG. 20 according to an example embodiment.

FIGS. 22 to 27 are timing diagrams of color data and depth data output from the processing circuit shown in FIG. 20, according to an example embodiment. Referring to FIGS. 20 and 22, the output control circuit 321 may output the color data CDATA and the depth data DDATA which are synchronized with a synchronization signal Hsync in a parallel manner in response to control signals CTRL. For example, the output control circuit 321 may output a first color data L1-COLOR DATA and a first depth data L1-DEPTH DATA which are synchronized with the synchronization signal Hsync in a parallel manner in a first section (or interval).

In addition, the output control circuit 321 may output a second color data L2-COLOR DATA and a second depth data L2-DEPTH DATA which are synchronized with the synchronization signal Hsync in a parallel manner in a second section. Moreover, the output control circuit 321 may output a third color data L3-COLOR DATA and a third depth data L3-DEPTH DATA which are synchronized with the synchronization signal Hsync in a parallel manner in a third section. Each section may be one-horizontal time 1H, and the synchronization signal Hsync may be a horizontal synchronization signal. For example, the one-horizontal time 1H may be defined as time for outputting line data corresponding to one line.

Figure 23:
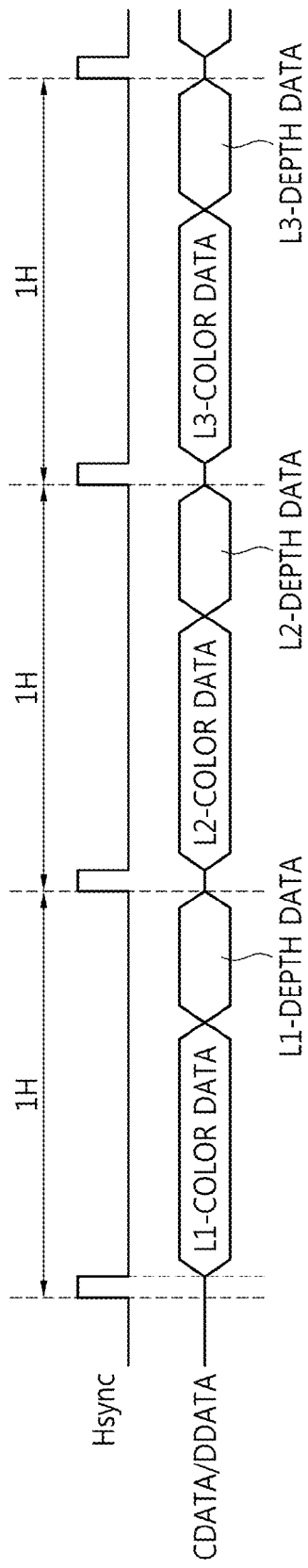

Referring to FIGS. 20 and 23, the output control circuit 321 may output color data CDATA and depth data DDATA in a serial manner using the synchronization signal Hsync in response to control signals CTRL For example, the output control circuit 321 may output the first color data L1-COLOR DATA prior to the first depth data L1-DEPTH DATA in the first section. The output control circuit 321 may output the second color data L2-COLOR DATA prior to the second depth data L2-DEPTH DATA in the second section. The output control circuit 321 may output the third color data L3-COLOR DATA prior to the third depth data L3-DEPTH DATA in the third section. At this time, a size of the color data may be larger than a size of the depth data.

Figure 24:
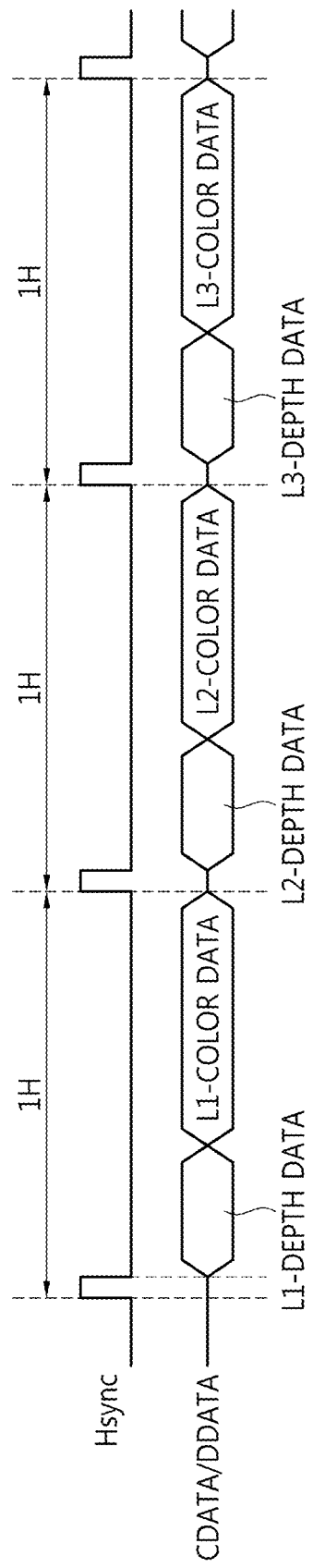

Referring to FIGS. 20 and 24, the output control circuit 321 may output the depth data DDATA and the color data CDATA in a serial manner using the synchronization signal Hsync in response to control signals CTRL. For example, the output control circuit 321 may output the first depth data L1-DEPTH DATA prior to the first color data L1-COLOR DATA in the first section. The output control circuit 321 may output the second depth data L2-DEPTH DATA prior to the second color data L2-COLOR DATA in the second section. The output control circuit 321 may output the third depth data L3-DEPTH DATA prior to the third color data L3-COLOR DATA in the third section. That is, the output control circuit 321 may determine an output order of the depth data DDATA and the color data CDATA in response to the control signal CTRL.

Figure 25:
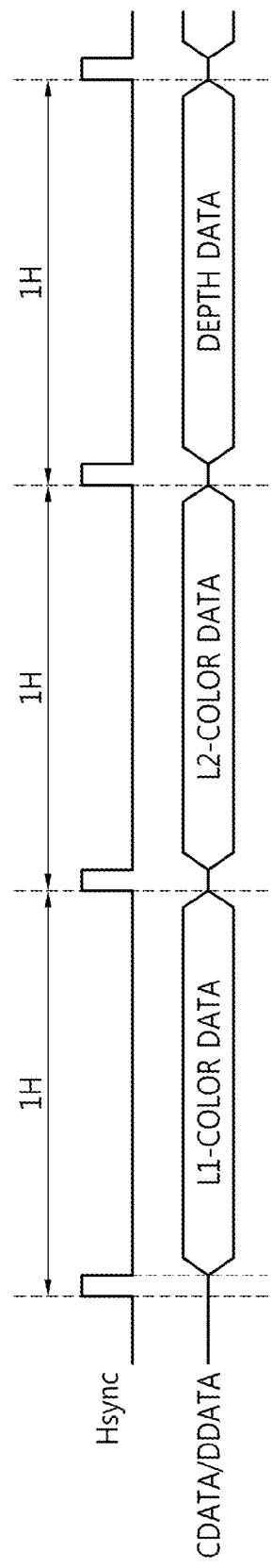

Referring to FIGS. 20 and 25, the output control circuit 321 may output depth data corresponding to B lines for each color data L1-COLOR DATA and L2-COLOR DATA corresponding to A lines using the synchronization signal Hsync in response to the control signals CTRL. At this time, each of A and B may be a natural number equal to or more than two, and A and B may be the same natural number or different natural numbers.

Figure 26:
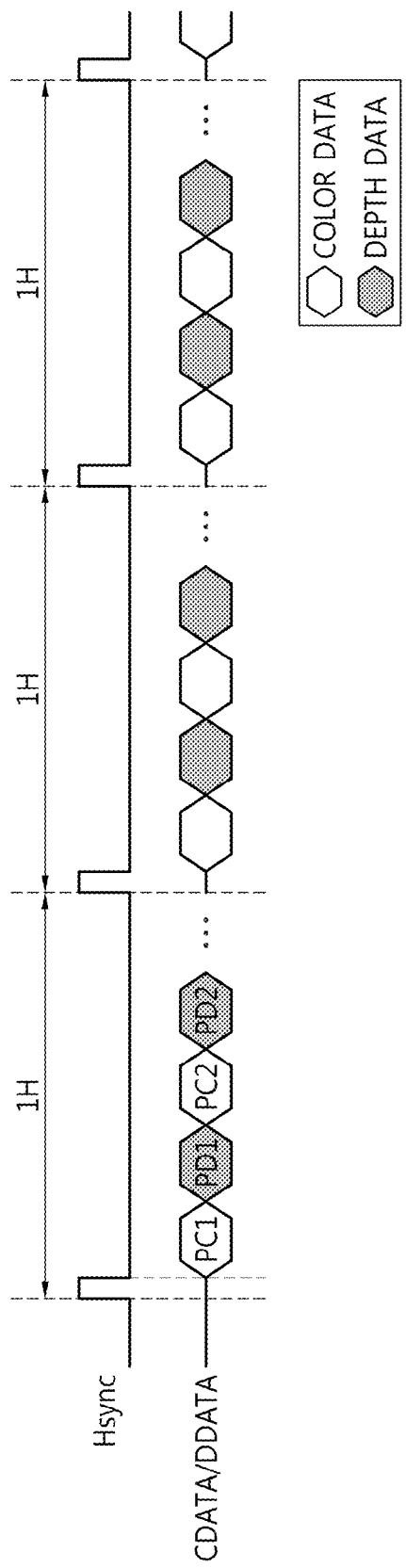

Referring to FIGS. 20 and 26, the output control circuit 321 may output color data PC1 and PC2 and depth data PD1 and PD2 on a pixel basis in a serial manner in response to the control signals CTRL. That is, the output control circuit 321 may alternately output color data and depth data on a pixel basis.

Figure 27:
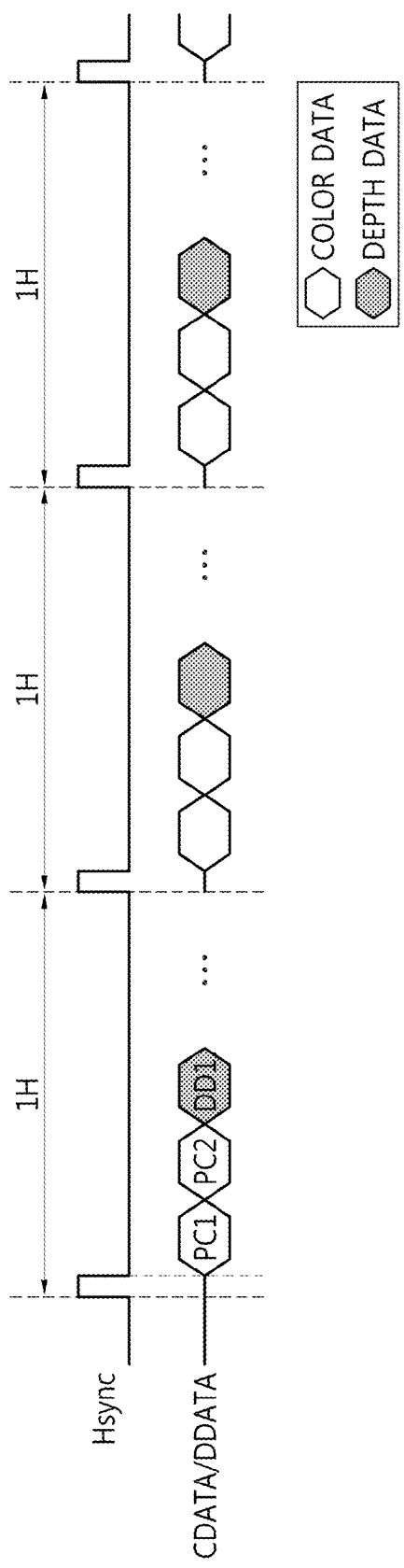

Referring to FIGS. 20 and 27, the output control circuit 321 may output depth data DD1 corresponding to D pixels for each color data PC1 and PC2 corresponding to C pixels in response to the control signals CTRL in a serial manner. At this time, each of C and D may be a natural number equal to or more than two, and C and D may be the same natural number or different natural numbers.

The output control circuit 321 may alternately output color data CDATA and depth data DDATA on a line or pixel basis. Moreover, the output control circuit 321 may mix and output the color data CDATA and the depth data DDATA. As described referring to FIGS. 22 to 27, the output control circuit 321 may control an output method and/or an output timing in response to the control signals CTRL.

Figure 28:
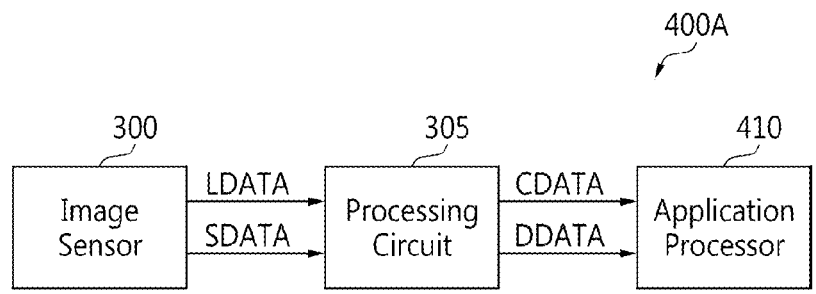
FIG. 28 is a block diagram which shows an example embodiment of the data processing device including the processing circuit shown in FIG. 20.

FIG. 28 is a block diagram which shows an example embodiment of the data processing device including the processing circuit shown in FIG. 20. A data processing device 400A may include the image sensor 300, the processing circuit 305, and the application processor 410. The image sensor 300 may be a first semiconductor chip, the processing circuit 305 may be a second semiconductor chip, and the application processor 410 may be a third semiconductor chip. The application processor 410 may process the color data CDATA and the depth data DDATA output from the processing circuit 305.

Figure 29:
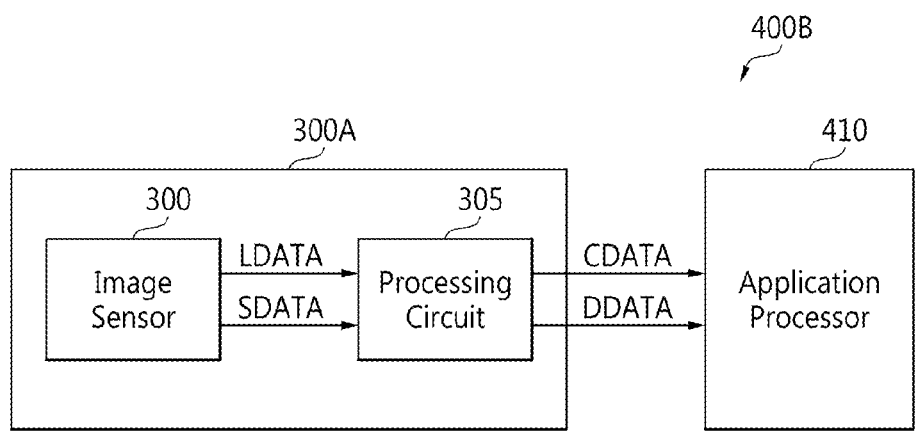
FIG. 29 is a block diagram which shows an example embodiment of the data processing device including the processing circuit shown in FIG. 20.

FIG. 29 is a block diagram which shows another example embodiment of the data processing device including the processing circuit shown in FIG. 20. A data processing device 400B may be an imaging device 300A including the image sensor 300 and the processing circuit 305. For example, the image sensor 300 and the processing circuit 305 may be integrated into the same semiconductor chip. For example, the image sensor 300 is a first semiconductor chip, and the processing circuit 305 is a second semiconductor chip, the image sensor 300 and the processing circuit 305 may be packaged into one semiconductor package. The application processor 410 may process the color data CDATA and the depth data DDATA output from the processing circuit 305.

Figure 30:
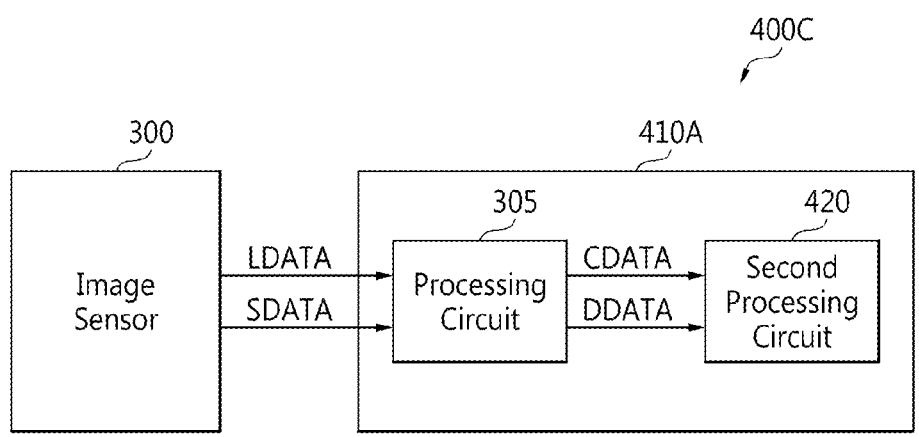
FIG. 30 is a block diagram which shows an example embodiment of the data processing device including the processing circuit shown in FIG. 20.

FIG. 30 is a block diagram which shows an example embodiment of the data processing device including the processing circuit shown in FIG. 20. A data processing device 400C may include the image sensor 300 and an application processor 410A including the processing circuit 305. When the processing circuit 305 is a first semiconductor chip, and a second processing circuit 420 is a second semiconductor chip, the application processor 410 A may be a system on chip (SoC).

Moreover, the processing circuit 305 and the second processing circuit 420 may share one semiconductor substrate as elements of the application processor 410A. The second processing circuit 420 may be an image signal processor or a multimedia processing circuit (e.g., a codec); however, the second processing circuit 420 is not limited thereto.

Figure 31:
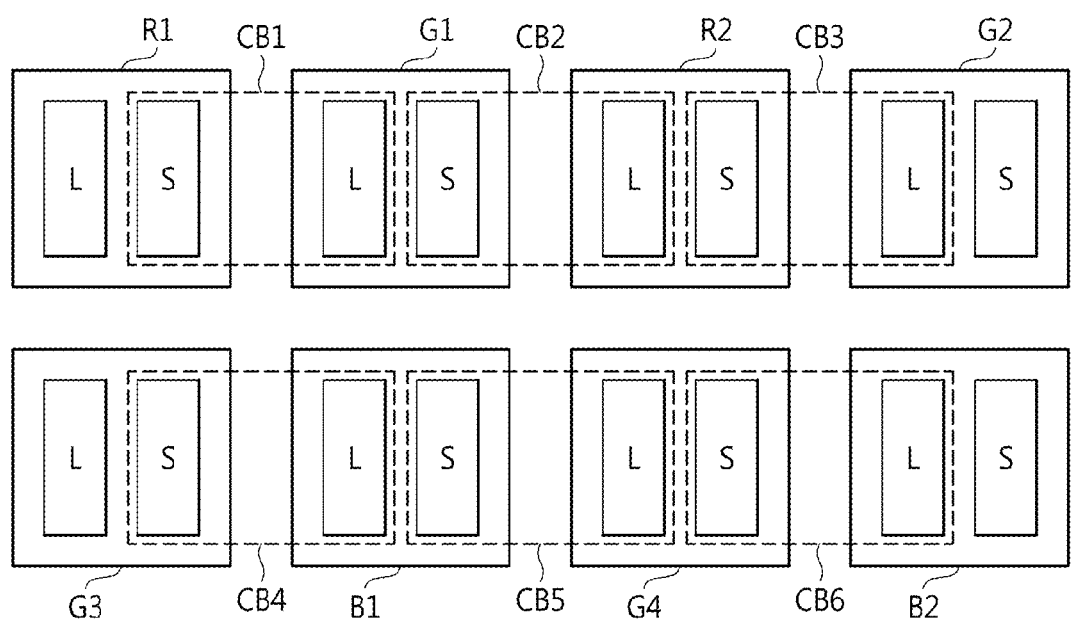
FIG. 31 is a conceptual diagram for resolution enhancement according to an example embodiment of the present inventive concepts.

FIG. 31 is a conceptual diagram for resolution enhancement according to an example embodiment of the present inventive concepts. Each pixel R1, G1, R2, G2, G3, B1, G4, or B2 embodied in FIG. 31 may correspond to each of the pixels R, G, B, and G shown in FIG. 1.

Each of the pixels R1, G1, R2, G2, G3, B1, G4, and B2 shown in FIG. 31 may include two photodiodes L and S which operate independently from each other.

In FIG. 31, L may be a photodiode which can generate a long-exposure image signal, and S may be a photodiode which can generate a short-exposure image signal.

When each of the pixels R1, G1, R2, G2, G3, B1, G4, and B2 are in the pixel array 100 of the CMOS image sensor 100, the readout circuit 525 outputs a digital image signal corresponding to a pixel signal output from each of the pixels R1, R2, G2, G3, B1, G4, and B2. Each of the pixels R1, G1, R2, G2, G3, B1, G4, and B2 corresponds to a pixel P.

The buffer 570 transfers image data IDATA corresponding to a plurality of digital image signals output from the readout circuit 525 to the ISP 610. The image data IDATA include the first image data corresponding to the long-exposure image signals, and the second image data corresponding to the short-exposure image signals.

The ISP 610 may generate interpolated image data using image data IDATA corresponding to a pixel signal of each of the pixels R1, G1, R2, G2, G3, B1, G4, and B2.

According to an example embodiment, the image data IDATA may be an output signal OUTPUT2 of the dynamic range compression circuit 220 of FIG. 17. According to another example embodiment, the image data IDATA may be data including output data (color data) of the color data processing circuit 310 and output data (depth data) of the PAF data processing circuit 320 of FIG. 20.

For example, the ISP 610 may generate a red signal or red data corresponding to a red pixel R1, generate a green signal or green data for the red pixel R1 by interpolating image data corresponding to pixel signals output from at least one pixel, and generate a blue signal or blue data for the red pixel R1 by interpolating image data corresponding to a pixel signal output from at least one blue pixel B1.

According to example embodiments, the number of pixels for interpolation may be variously changed.

For example, the ISP 610 may generate a green signal or green data corresponding to a green pixel G1, generate a red signal or red data for the green pixel G1 by interpolating image data corresponding to pixel signals output from at least one peripheral pixel, and generate a blue signal or blue data for the red pixel R1 by interpolating image data corresponding to a pixel signal output from at least one peripheral blue pixel B1.

Moreover, the ISP 610 may perform an interpolation for a combination pixel CB1 using image data corresponding to pixel signals of peripheral pixels R1, G1, G3, and B1. Here, the combination pixel CB1 may be a virtual pixel including S of the red pixel R1 and L of the green pixel G1.

For example, the ISP 610 may generate a read signal of the combination pixel CB1 by interpolating image data corresponding to a pixel signal output from S of the red pixel R1, generate a green signal of the combination pixel CB1 by interpolating image data corresponding to a pixel signal output from L of the green pixel G1, and generate a blue signal of the combination pixel CB1 by interpolating image data corresponding to a pixel signal output from the blue pixel B1.

For example, the ISP 610 may generate a green signal of a combination pixel CB6 by interpolating image data corresponding to a pixel signal output from S of a green pixel G4, generate a blue signal of the combination pixel CB6 by interpolating image data corresponding to a pixel signal output from L of a blue pixel B2, and generate a red signal of the combination pixel CB6 by interpolating image data corresponding to a pixel signal output from a red pixel R2.

Example embodiments described above merely describe an interpolation for the combination pixels CB1 and CB6, but a technical concept of the present inventive concepts is not limited to the described example embodiments.

In comparison with known interpolation methods, an interpolation for each of the combination pixels CB1 to CB6 is not performed. However, a red signal, a green signal, and a blue signal interpolated for each of the combination pixels CB1 to CB6 can be generated by interpolating image data corresponding to a pixel signal(s) output from a peripheral pixel(s) of each of the combination pixels CB1 to CB6 in an example embodiment of the present inventive concepts.

In the same manner as described above, as an interpolation for a combination pixel is performed, resolution of the CMOS image sensor can be enhanced.

The number of pixels for the interpolation for a combination pixel and an interpolation method may be variously changed according to an example embodiment.

Figure 32:
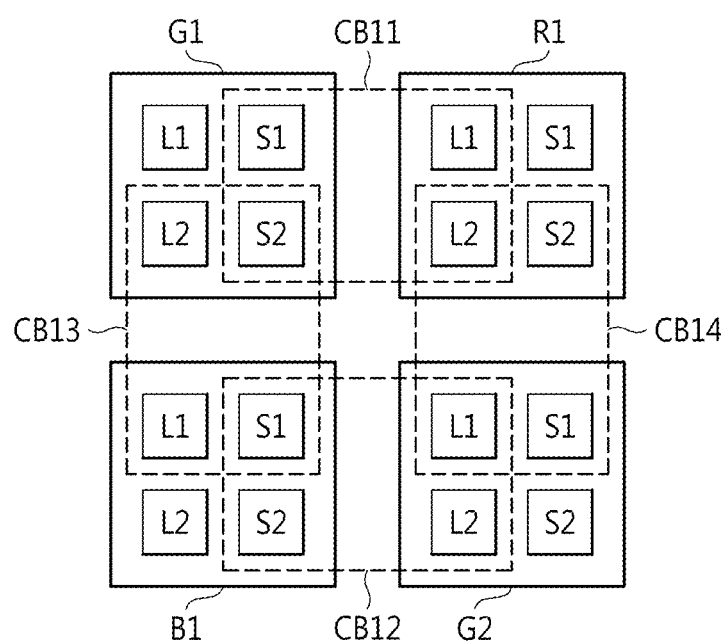
FIG. 32 is a conceptual diagram for resolution enhancement according to an example embodiment of the present inventive concepts.

FIG. 32 is a conceptual diagram for resolution enhancement according to another example embodiment of the present inventive concepts. Each pixel G1, R1, B1, or G2 embodied in FIG. 32 may correspond to each of the pixels R, G, B, and G shown in FIG. 1.

Each of the pixels G1, R1, B1, and G2 shown in FIG. 32 may include four photodiodes L1, L2, S1, and S2 which operate independently from each other.

In FIG. 32, each of L1 and L2 may be a photodiode which can generate a long-exposure image signal, and each of S1 and S2 may be a photodiode which can generate a short-exposure image signal.

When each of the pixels G1, R1, B1, and G2 is in the pixel array 100 of the CMOS image sensor 100 of FIG. 16, the readout circuit 525 outputs a digital image signal corresponding to a pixel signal output from each of the pixels G1, R1, B1, and G2. Each of the pixels G1, R1, B1, and G2 corresponds to a pixel P.

The buffer 570 transfers image data IDATA corresponding to the plurality of digital image signals output from the readout circuit 525 to the ISP 610. The image data IDATA include the first image data corresponding to the long-exposure image signals and the second image data corresponding to the short-exposure image signals.

The ISP 610 may generate interpolated image data using image data IDATA corresponding to a pixel signal of each of the pixels G1, R1, B1, and G2.

According to an example embodiment, the image data IDATA may be an output signal OUTPUT2 of the dynamic range compression circuit 220 of FIG. 17. According to another example embodiment, the image data IDATA may be data including output data (color data) of the color data processing circuit 310 and output data (depth data) of the PAF data processing circuit 320 of FIG. 20.

For example, the ISP 610 may generate a green signal corresponding to the green pixel G1, generate a red signal for the green pixel G1 by interpolating image data corresponding to pixel signals output from at least one peripheral pixel, and generate a blue signal for the green pixel G1 by interpolating image data corresponding to a pixel signal output from at least one peripheral blue pixel B1.

According to example embodiments, the number of pixels necessary for an interpolation can be variously changed.

In addition, the ISP 610 may perform an interpolation for a combination pixel CB11 using image data corresponding to pixel signals of the pixels G1, R1, B1, and G2. Here, the combination pixel CB1 may be a virtual pixel including S1 and S2 of the green pixel G1 and L1 and L2 of the red pixel R1.

For example, the ISP 610 may generate a green signal of the combination pixel CB11 by interpolating image data corresponding to a pixel signal output from S1 and S2 of the green pixel G1, generate a red signal of the combination pixel CB11 by interpolating image data corresponding to a pixel signal output from L1 and L2 of the red pixel R1, and generate a blue signal of the combination pixel CB11 by interpolating image data corresponding to a pixel signal output from the blue pixel B1.

For example, the ISP 610 may generate a green signal of a combination pixel CB13 by interpolating image data corresponding to a pixel signal output from L2 and S2 of the green pixel G1, generate a blue signal of the combination pixel CB13 by interpolating image data corresponding to a pixel signal output from L1 and S1 of the blue pixel B1, and generate a red signal of the combination pixel CB13 by interpolating image data corresponding to a pixel signal output from the red pixel R1.

Example embodiments described above merely describe an interpolation for the combination pixels CB11 and CB13, but the technical concept of the present inventive concepts is not limited to the described example embodiments.

In an interpolation method of the related art, an interpolation for each of combination pixels CB11 to CB14 is not performed. However, a red signal, a green signal, and a blue signal interpolated for each of the combination pixels CB11 to CB14 can be generated by interpolating image data corresponding to a pixel signal(s) output from a peripheral pixel(s) of each of the combination pixels CB11 to CB14 in an example embodiment of the present inventive concepts.

In the same manner as described above, as an interpolation for a combination pixel is performed, resolution of the CMOS image sensor can be enhanced.

The number of pixels necessary for the interpolation for a combination pixel and an interpolation method may be variously changed according to an example embodiment.

FIGS. 21 and 22 are merely example embodiments. However, an interpolation method for a combination pixel may be determined according to how to define the combination pixel.

Although several example embodiments of the present inventive concepts have been shown and described, it will be appreciated by those skilled in the art that changes may be made in these example embodiments without departing from the principles and spirit of the general inventive concept, the scope of which is defined in the appended claims and their equivalents.

What is claimed is:

1. An image processing device comprising:
a pixel array comprising a plurality of pixels and configured to capture an image, each of the pixels comprising a plurality of photoelectric conversion elements; and
a processing circuit configured to generate image data from pixel signals output from the pixels and configured to extract color data and depth data from the image data.

2. The image processing device of claim 1, wherein the pixels comprise a first green pixel and a second green pixel, the first green pixel comprising at least two photoelectric conversion elements to generate at least two long exposure image signals and the second green pixel comprising at least two photoelectric conversion elements to generate at least two short exposure image signals.

3. The image processing device of claim 2, wherein the pixels further comprise a first red pixel comprising at least two photoelectric conversion elements to generate at least two long exposure image signals and a first blue pixel comprising at least two photoelectric conversion elements to generate at least two long exposure image signals.

4. The image processing device of claim 3, wherein the pixels further comprise a second red pixel comprising at least two photoelectric conversion elements to generate at least two short exposure image signals and a second blue pixel comprising at least two photoelectric conversion elements to generate at least two short exposure image signals.

5. The image processing device of claim 2, wherein the pixels further comprise a first red pixel comprising at least two photoelectric conversion elements to generate at least two short exposure image signals and a first blue pixel comprising at least two photoelectric conversion elements to generate at least two short exposure image signals.

6. The image processing device of claim 5, wherein the pixels further comprise a second red pixel comprising at least two photoelectric conversion elements to generate at least two long exposure image signals and a blue pixel comprising at least two photoelectric conversion elements to generate at least two long exposure image signals.

7. The image processing device of claim 1, wherein the image data comprise long-exposure image data and short-exposure image data, the long-exposure image data corresponding to pixel signals associated with pixels with longer exposure time to light compared to pixel signals associated with the short-exposure image data.

8. The image processing device of claim 7, wherein the processing circuit is configured to process the image data by extracting disparity data between each pair of the long-exposure image data and the short-exposure image data.

9. A mobile device comprising:
a pixel array comprising a plurality of pixels and configured to capture an image, each of the pixels comprising a plurality of first photoelectric conversion elements connected to a first row signal and a second photoelectric conversion elements connected to a second row signal; and
a processing circuit configured to generate image data from pixel signals output from the pixels and configured to extract color data and depth data from the image data.

10. The mobile device of claim 9, wherein the first row signal is connected to a transfer transistor of each of the first photoelectric conversion elements and the second row signal is connected to a transfer transistor of each of the second photoelectric conversion elements.

11. The mobile device of claim 10, wherein the first row signal and the second row signal are controlled independently based on exposure time each of the first photoelectric conversion elements and the second photoelectric conversion elements.

12. The mobile device of claim 9, wherein the pixels comprise a first green pixel and a second green pixel, the first green pixel comprising at least two photoelectric conversion elements to generate at least two long exposure image signals and the second green pixel comprising at least two photoelectric conversion elements to generate at least two short exposure image signals.

13. The mobile device of claim 12, wherein the pixels further comprise a first red pixel comprising at least two photoelectric conversion elements to generate at least two long exposure image signals and a first blue pixel comprising at least two photoelectric conversion elements to generate at least two long exposure image signals.

14. The mobile device of claim 13, wherein the pixels further comprise a second red pixel comprising at least two photoelectric conversion elements to generate at least two short exposure image signals and a second blue pixel comprising at least two photoelectric conversion elements to generate at least two short exposure image signals.

15. The mobile device of claim 12, wherein the pixels further comprise a first red pixel comprising at least two photoelectric conversion elements to generate at least two short exposure image signals and a first blue pixel comprising at least two photoelectric conversion elements to generate at least two short exposure image signals.

16. The mobile device of claim 15, wherein the pixels further comprise a second red pixel comprising at least two photoelectric conversion elements to generate at least two long exposure image signals and a blue pixel comprising at least two photoelectric conversion elements to generate at least two long exposure image signals.

17. A mobile device comprising:
a pixel array comprising a plurality of pixels and configured to capture an image, each of the pixels comprising a plurality of first photodiodes formed under a first color filter and a plurality of second photodiodes formed under a second color filter; and
a processing circuit configured to generate image data from pixel signals output from the pixels and configured to extract color data and depth data from the image data, wherein the first color filter and the second color filter are color filters having the same color.

18. The mobile device of claim 17, wherein the pixels further comprise a plurality of third photodiodes formed under a third color filter and a plurality of fourth photodiodes formed under a fourth color filter.

19. The mobile device of claim 18, wherein each of the first photodiodes generates a long exposure image signal and each of the second photodiodes generates a short exposure image signal.

20. The mobile device of claim 19, wherein each of the third photodiodes and fourth photodiodes generates at least one of a long exposure image signal or a short exposure image signal.

\* \* \* \* \*